Horace V. Smith, Sr.
George M. Clark
INVENTORS
James F. Weiler
BY Jefferson D. Giller
Dudley R. Dobie, Jr
Henry W. Hope
ATTORNEYS

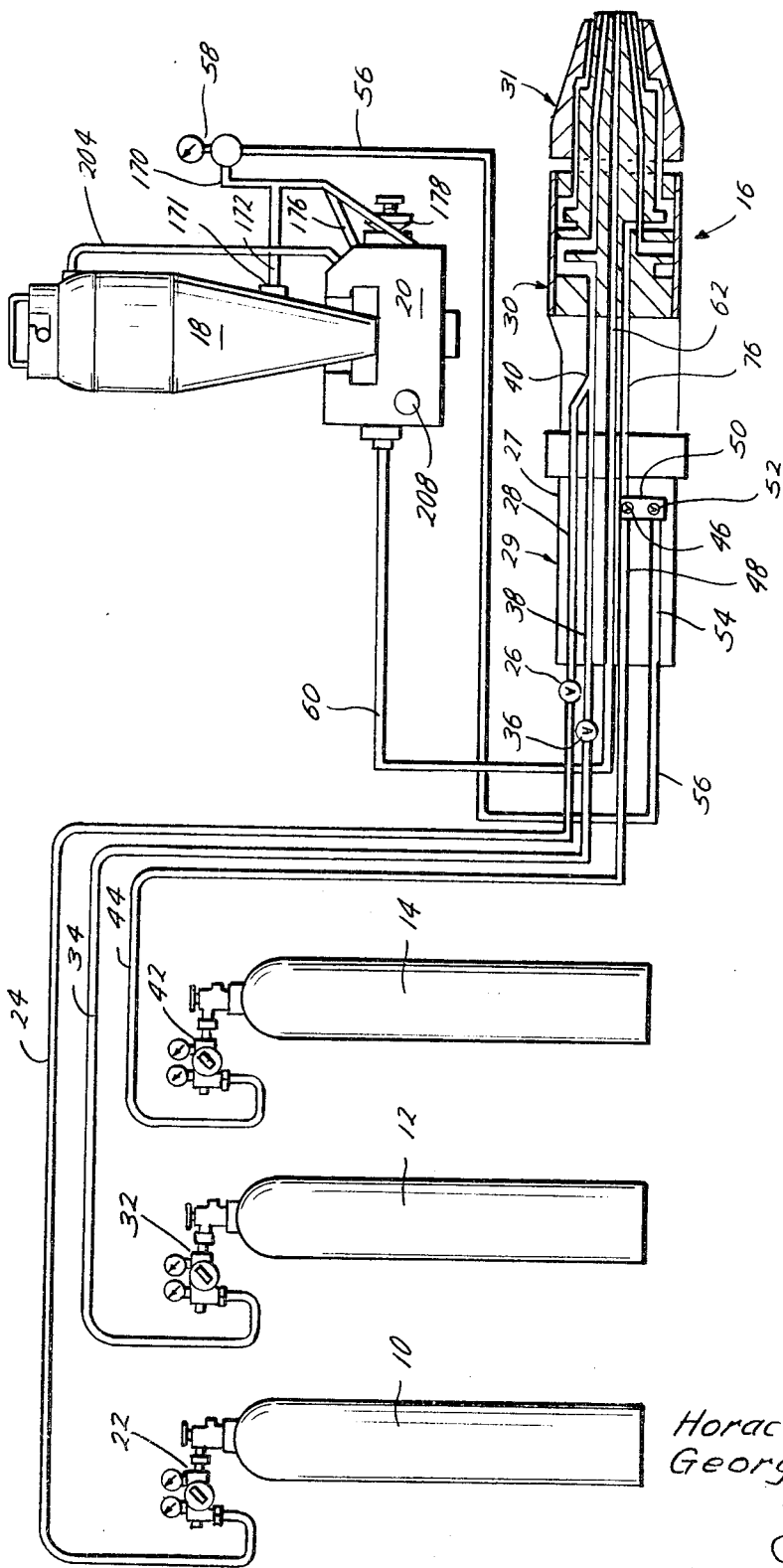

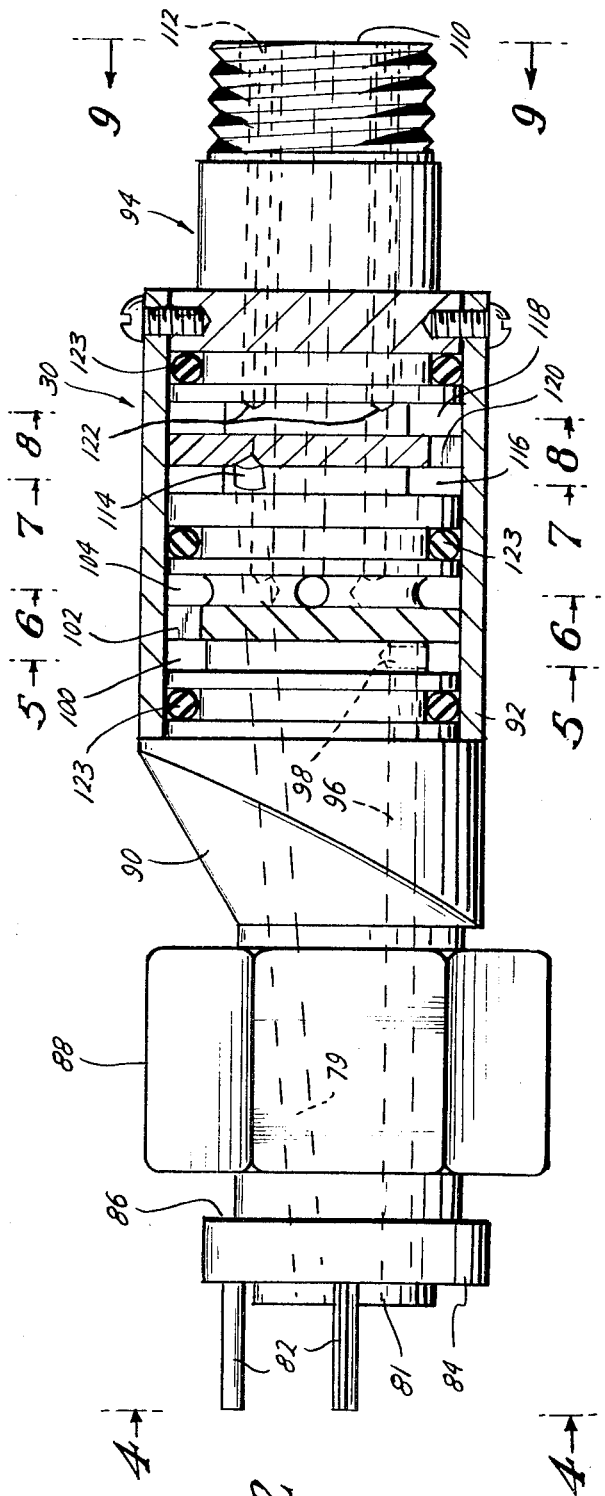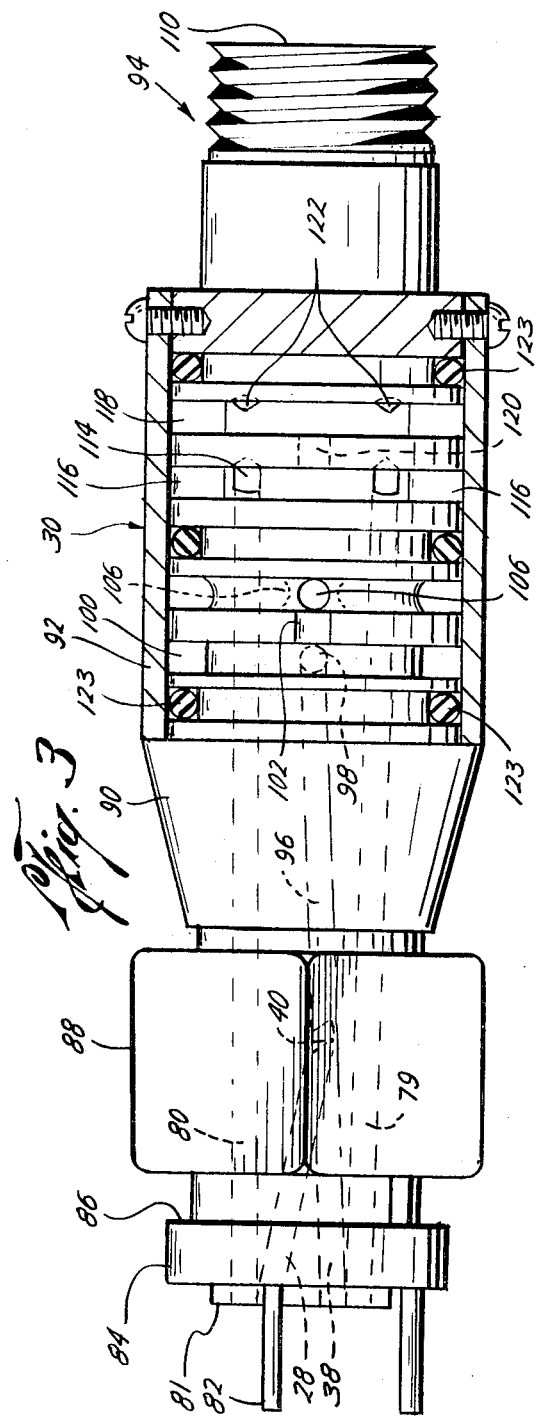

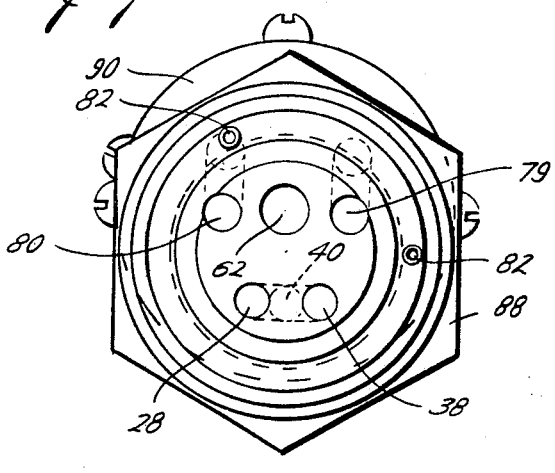
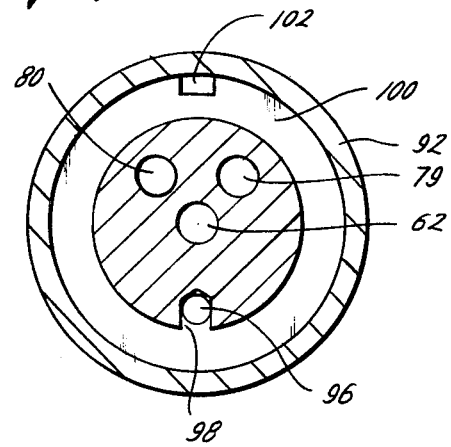
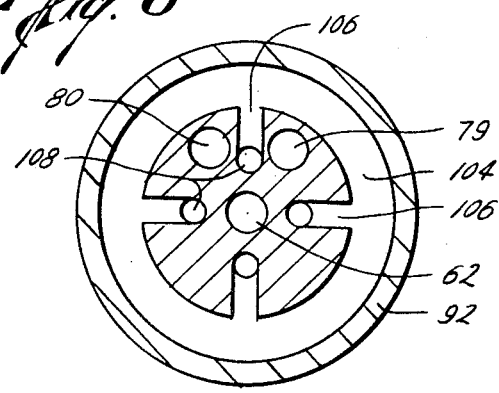
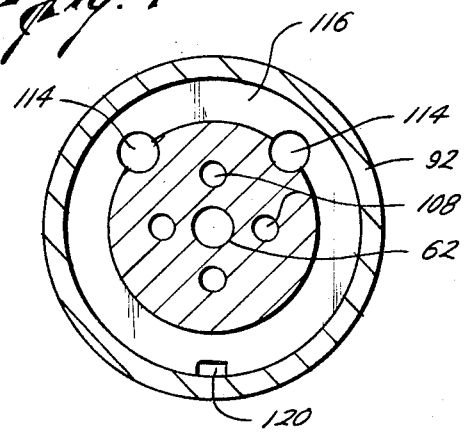
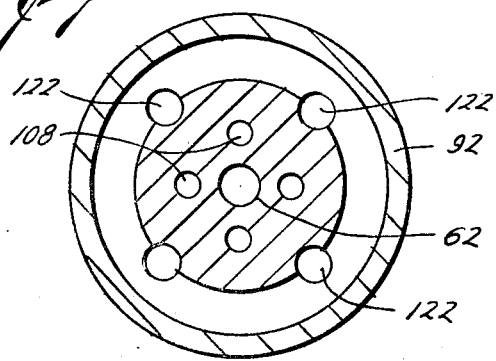

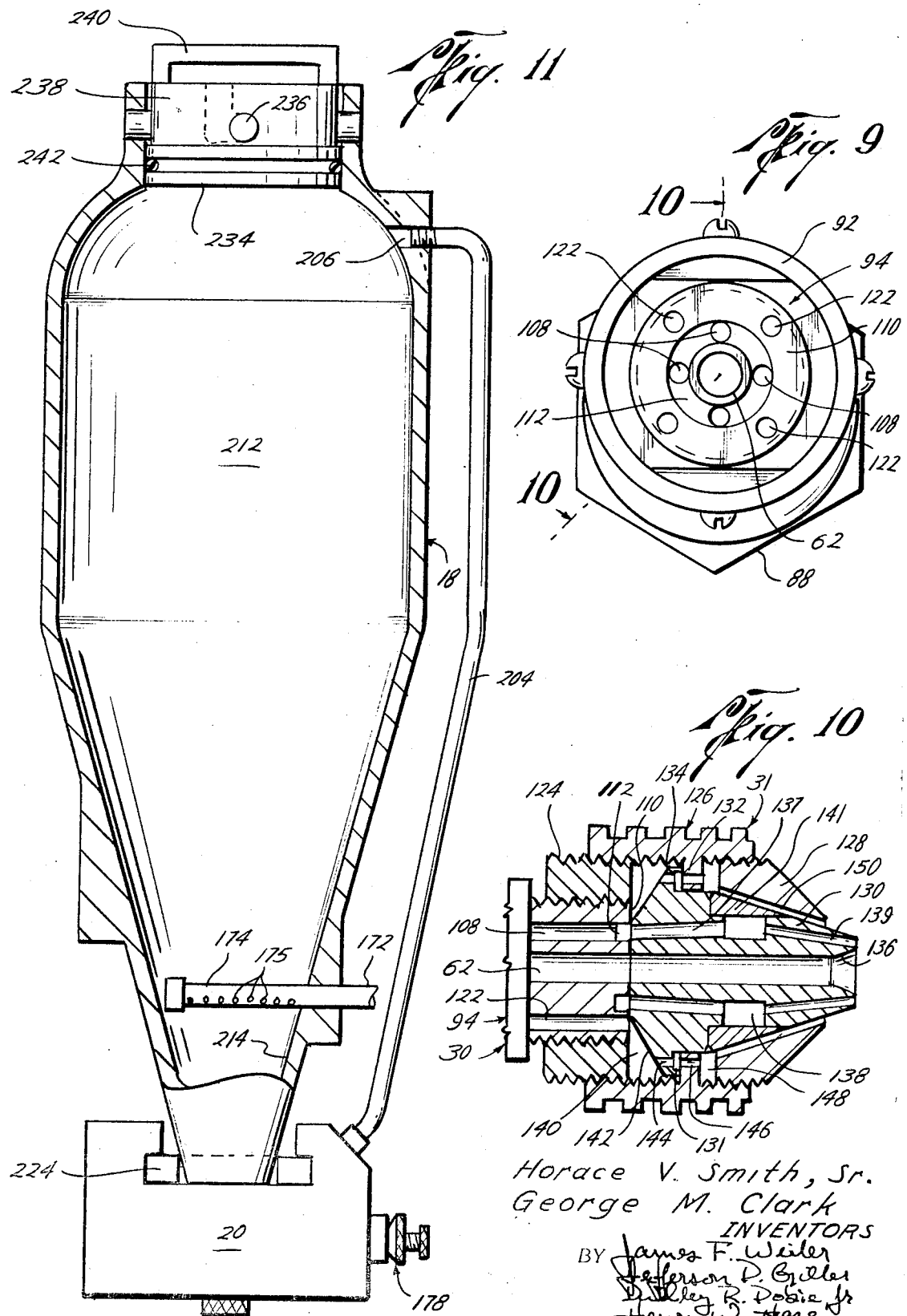

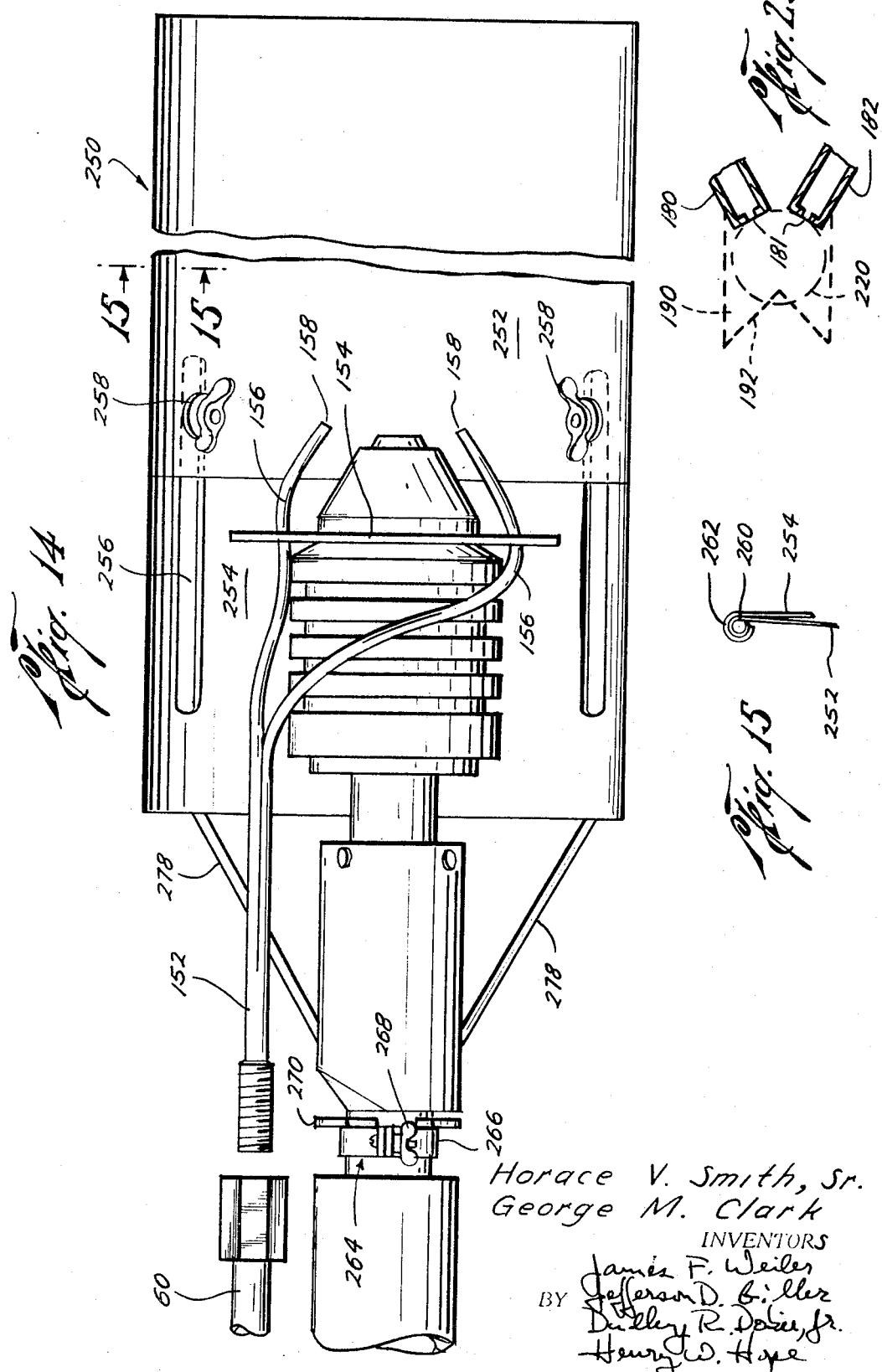

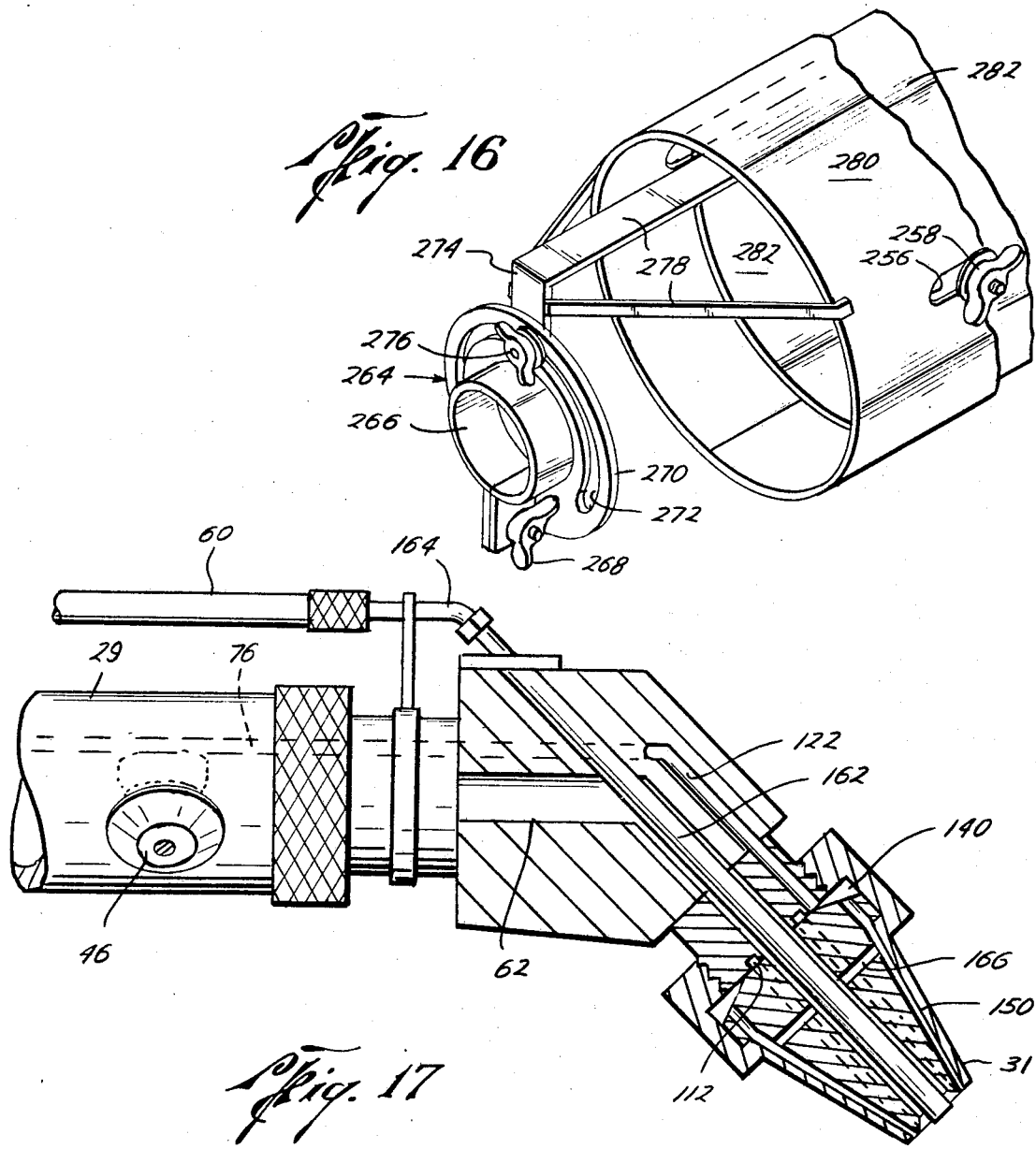

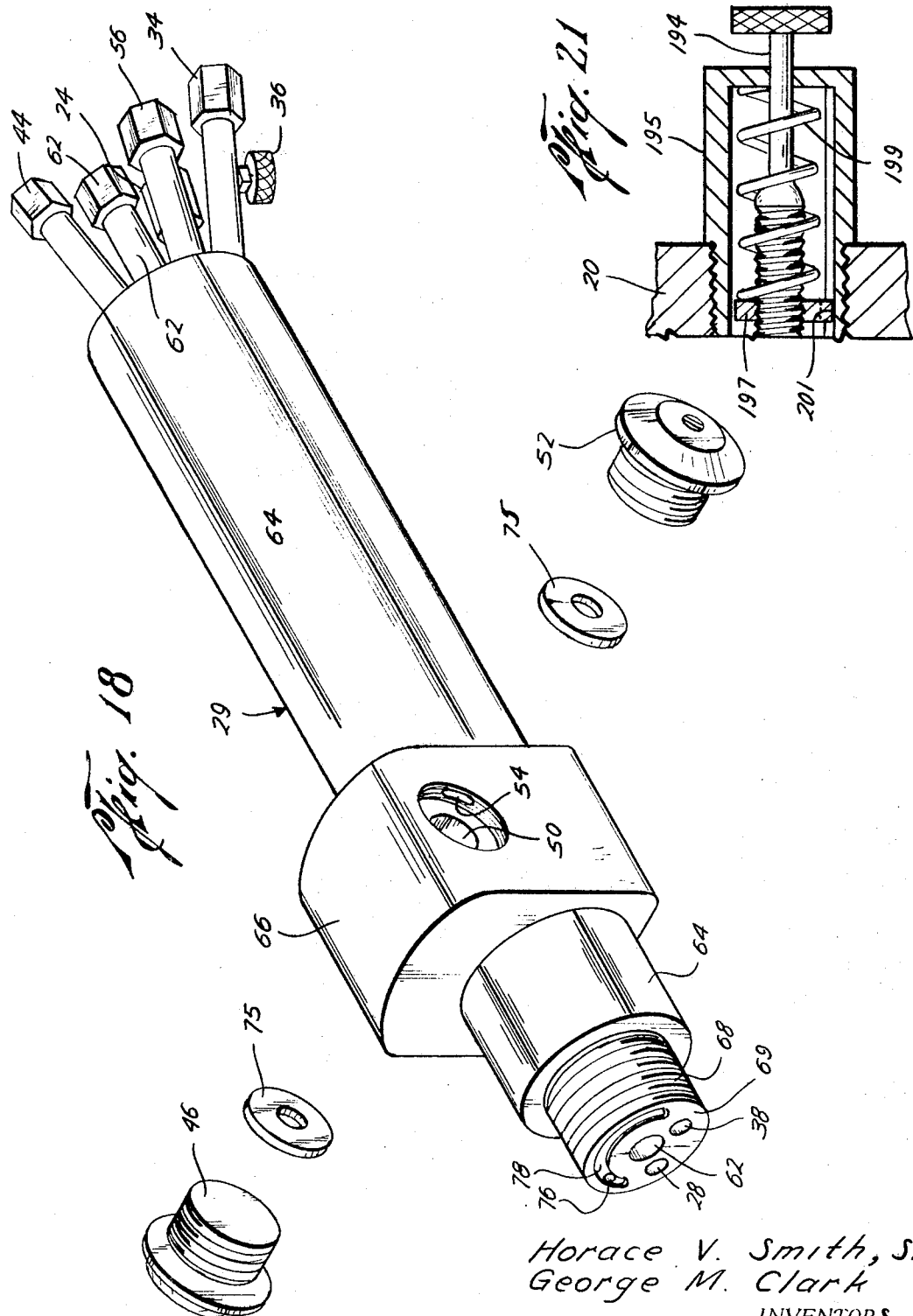

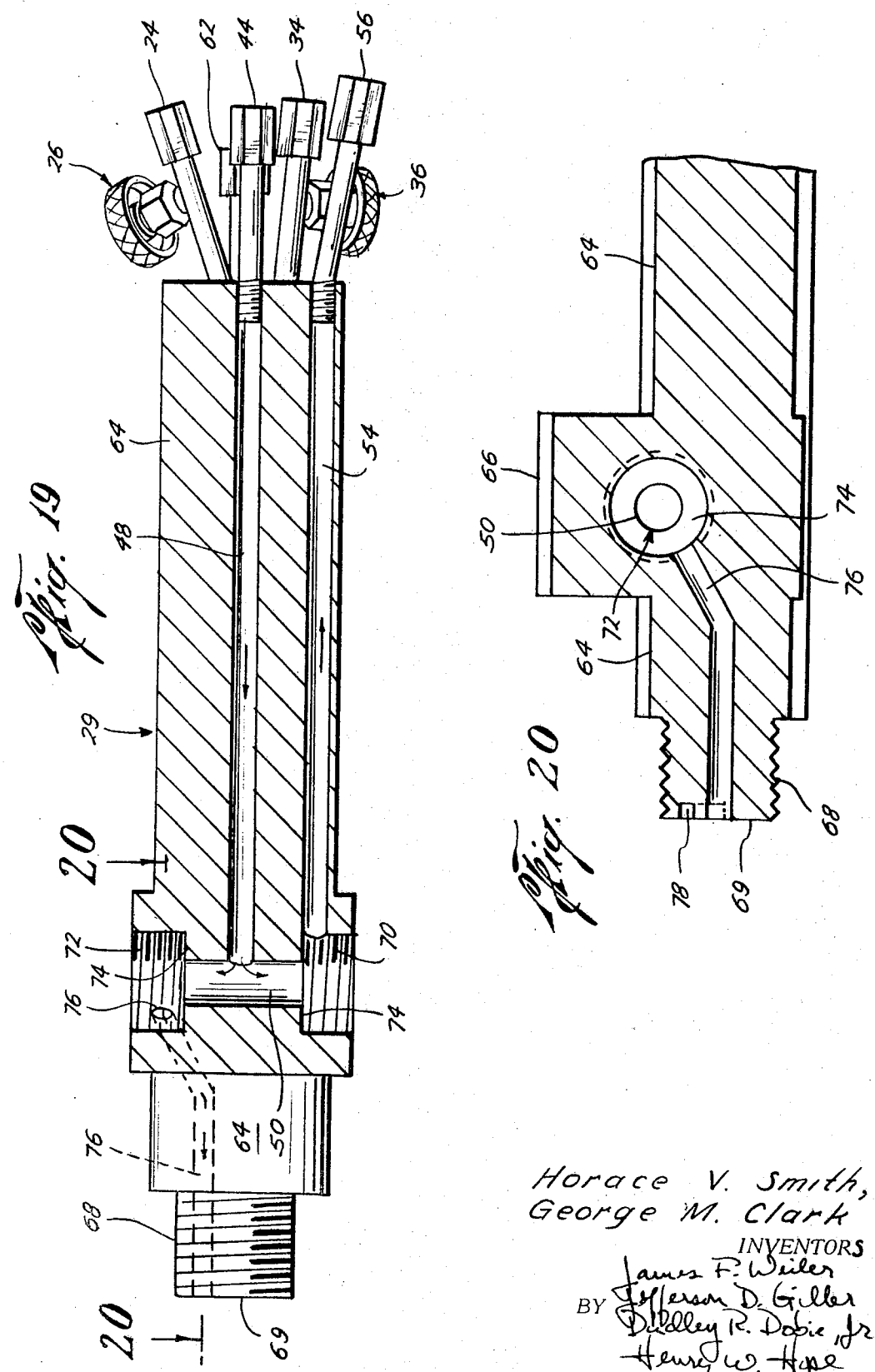

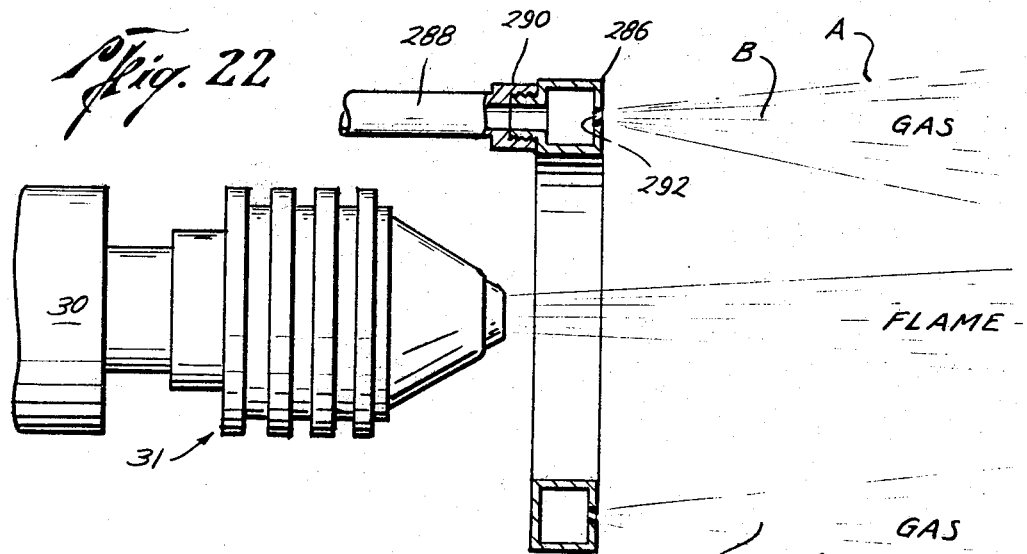
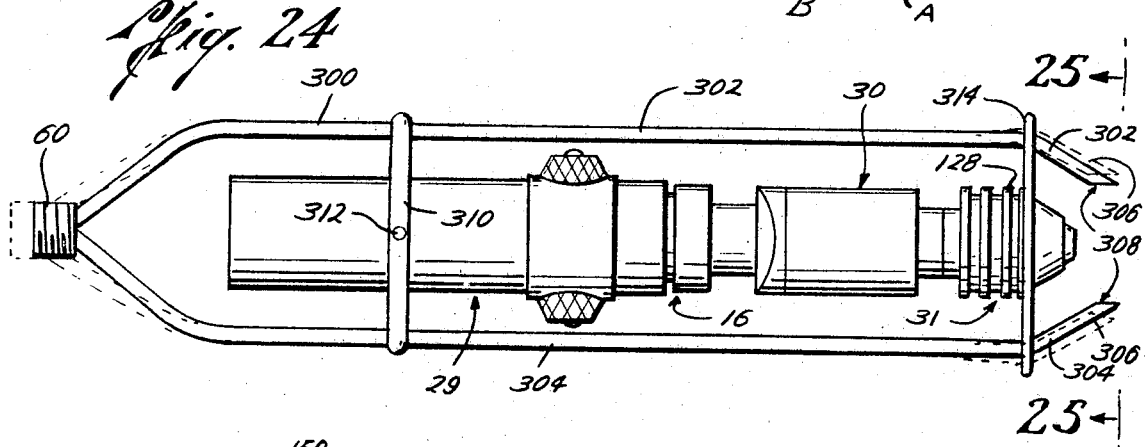
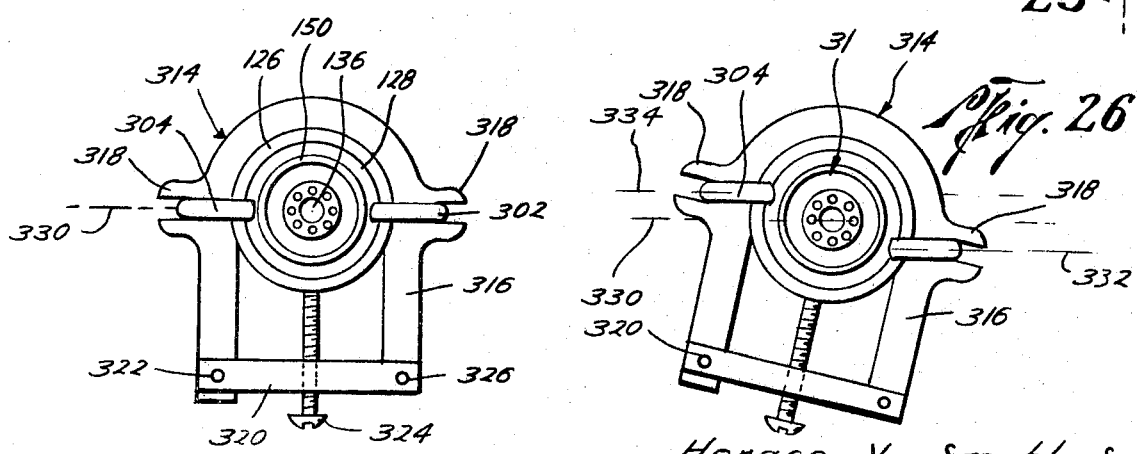

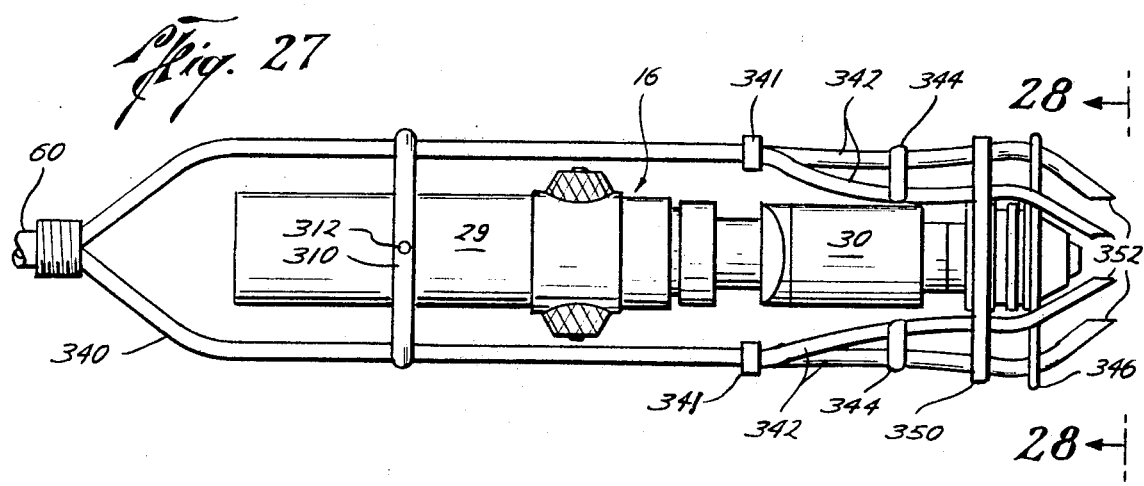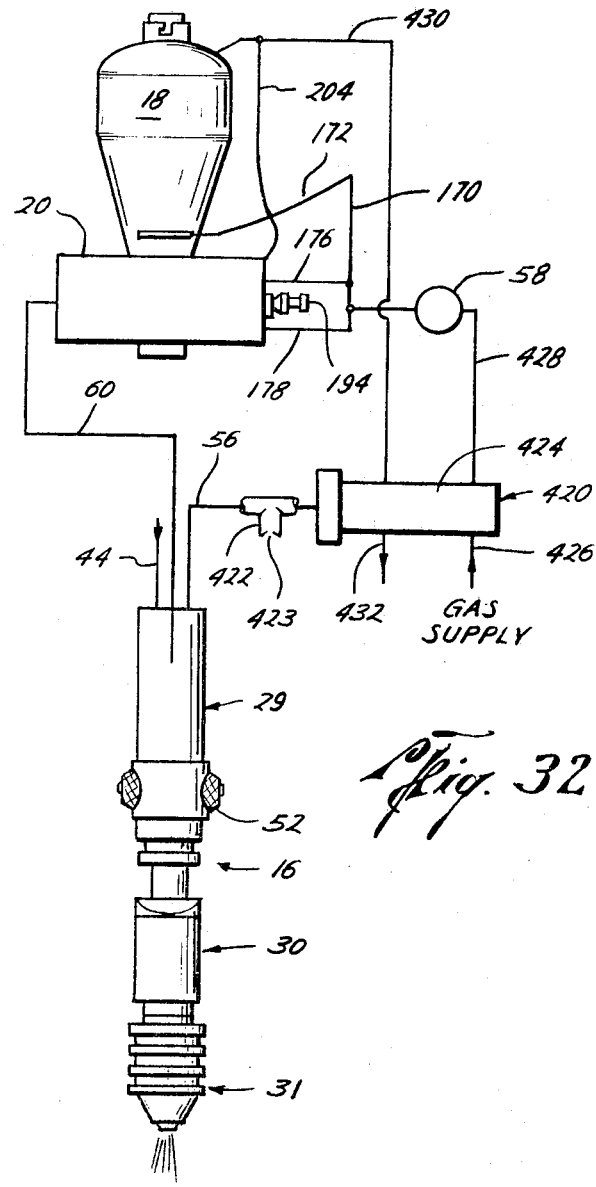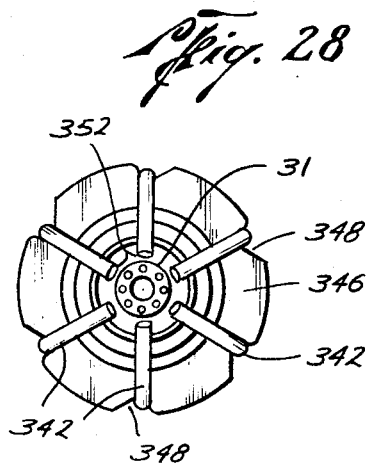

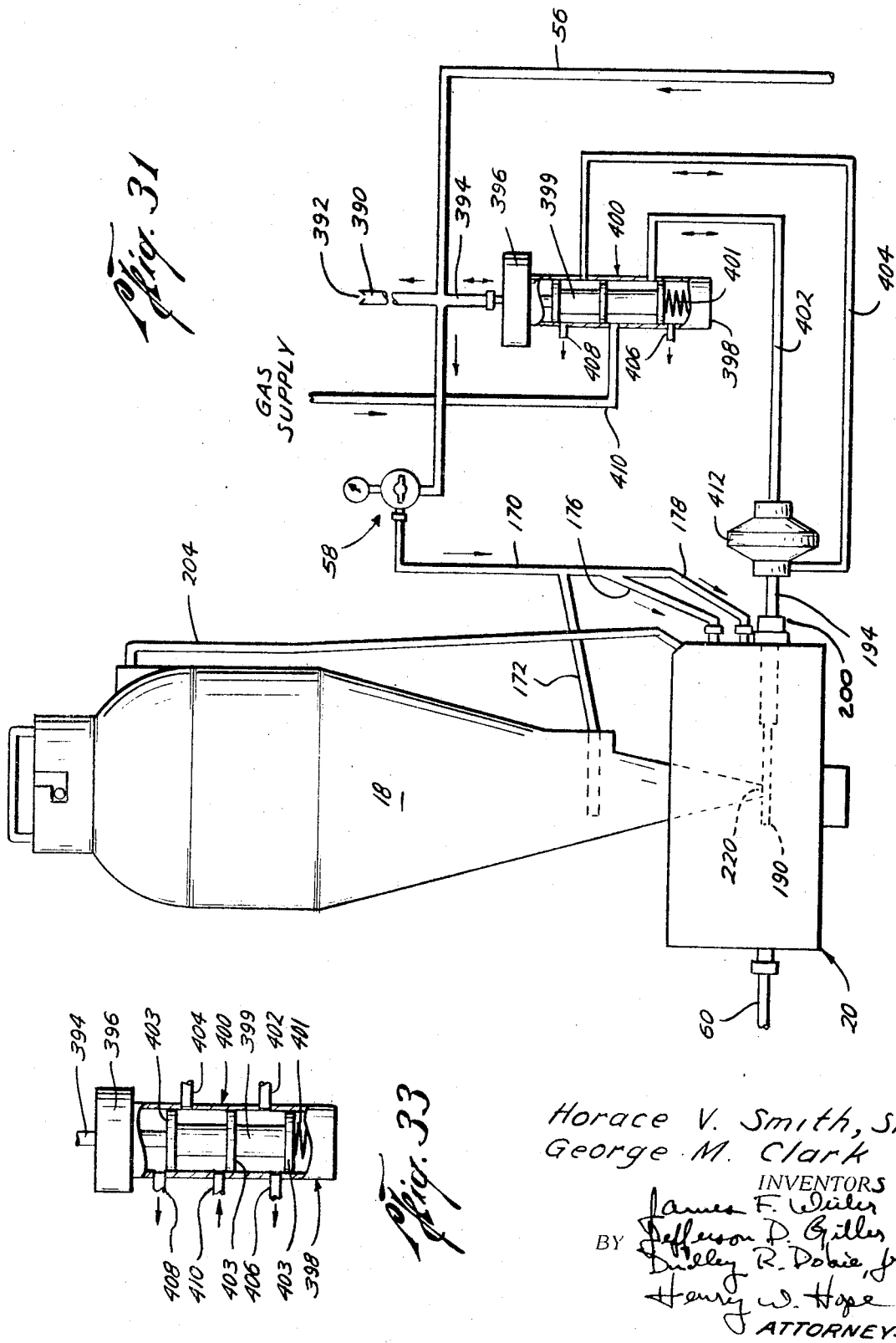

United States Patent Office

3,514,036
Patented May 26, 1970

---

3,514,036
FLAME SPRAYING EQUIPMENT
Horace V. Smith, Sr., and George M. Clark, Houston, Tex., assignors to Powder Weld International Corporation, Houston, Tex., a corporation of Texas
Filed Dec. 14, 1967, Ser. No. 690,455
Int. Cl. B05b 7/00
U.S. Cl. 239—85       14 Claims

ABSTRACT OF THE DISCLOSURE

The present invention relates to apparatus for flame spraying powdered material, and more particularly, to improved torch and powder supply equipment and to systems utilizing the improved equipment for flame spraying powdered material. An improved torch assembly is utilized which provides for a better gas mixture and for heat exchange means. Interior and exterior feeding of the material to the torch flame is incorporated as well as concentrically disposed tubes for conveying the powdered material with reduced fusing to the torch. An improved powdered material container and proportioner is employed to give a more even and controlled dispersion of the material in the carrier gas stream and remote control means are utilized to control the feed of powder. Improved bonding of the material and a reduced pressure for the carrier gas is brought about by the improved system.

BACKGROUND OF THE INVENTION

The present invention is directed to the field of applying coatings to objects, and more particularly, to bonding powdered materials to these objects by flame spraying the materials onto the objects.

The flame spraying of powdered materials to form coatings is becoming increasingly popular in the coating field. Various methods and types of apparatus have been devised to perform this coating function. Certain problem areas have, however, developed. For example, heat generated at the nozzle tip flows back into the torch and occasionally causes fusing of the powdered material to the torch, with resultant clogging of the torch. In addition, the uniformity of flow of the powdered material dispensed within the carrier gas stream and the controls regulating the powdered material supplied to the torch are often unsatisfactory.

The number of gases that must be supplied to the nozzle brings about problems as to the design of the torch. Joints, seals and seat are difficult to manufacture economically and yet prevent leakage and internal backfiring of the torch.

Problems are also presented in feeding the powdered material to the flame. To coat with large amounts of powdered material requires a large flame which, in turn, heats up the torch, thereby making it difficult to hold and also increasing the fusing of the material to the torch. To carry the powdered material, increased amounts of carrier gas must be used. This additional amount of gas tends to cool the flame, thus requiring an even larger flame.

SUMMARY OF THE INVENTION

The present invention employs improvements in the powder spraying apparatus, and particularly in the torch and powder supply assembly. An improved powder container provides an even and controlled feed of the material into the carrier gas stream. With the proportioner assembly disclosed herein, a larger amount of material may be picked up and sprayed with the same quantity of carrier gas. The result is less carrier gas in proportion to the powdered material, whereby there will be decreased cooling of the flame.

Inside and outside feed of the powdered material to the flame is provided for, thus giving a more intimate contact of the material with the flame so that the powder will be completely melted and will, therefore, provide for better bonding of the coating to the object being sprayed. Furthermore, the newly designed torches disclosed herein can provide a large flame if desired. One embodiment includes an internal powder tube surrounded by shroud gas for additional cooling of the powdered material at the torch tip. Heat exchange means cools the torch with the dissipated heat being carried away by the fuel gases as they exit from the torch. The agitation resulting from the heat exchange means functions to further mix the combustion and combustion sustaining gases. In addition, the torch utilizes a simplified design to eliminate many of the series drawbacks in prior art devices in forming seats, seals and joints.

Remote control means are utilized which allow the operator to shut off or turn on the powdered material feed from the powder source. Means are employed to protect the flame from environmental conditions and improved outside feeding arrangements are disclosed which bring about a better pattern of spray and a better bonding of the coating.

It is, therefore, an object of the present invention to provide an improved powder spraying apparatus for the flame spraying of powdered materials.

Another object of the present invention is to provide such improved apparatus having heat exchange means for the cooling of the torch and to more completely mix the flame producing and sustaining gases.

An additional object is to provide improved means for the dispersement of the powdered material within the carrier gas stream and for the conveying of said powder to the torch.

Another object is to provide such apparatus which can spray increased quantities of powdered material by the reduction of the amount of carrier gas needed and by the provision of a larger and/or hotter flame.

Still another object is to provide such flame spraying apparatus having means for internal and/or external feeding of the powdered material to the flame and which bring about a better contact between the flame and powdered material and result in a better spray pattern and coating.

Other and further objects, features and advantages will be apparent from the following description of a presently preferred embodiment of the invention given for the purpose of disclosure, when taken in conjunction with the accompanying drawings.

BRIEF DESCRIPTION OF THE DRAWINGS

In the drawings, like character references designate like parts throughout the several views which are as follows:

FIG. 1 is a schematic diagram of the apparatus utilized in the preferred embodiment of the invention, FIG. 2 is a side view, partially in section, showing the head portion of one embodiment of the improved torch, FIG. 3 is a top view, partially in section, of the apparatus shown in FIG. 2, FIG. 4 is an end view taken along lines 4—4 of FIG. 2, FIG. 5 is a section view taken along lines 5—5 of FIG. 2, FIG. 6 is a section view of the apparatus shown in FIG. 2 and taken along section lines 6—6, FIG. 7 is a section view of the apparatus shown in FIG. 2 and taken along section lines 7—7 of FIG. 2, FIG. 8 is a section view of the apparatus shown in FIG. 2 and taken along section lines 8—8 of FIG. 2, FIG. 9 is an end view of the apparatus shown in FIG. 2 and taken along lines 9—9 of FIG. 2, FIG. 10 is a side-section view taken along section lines 10—10 of FIG. 9, but showing the nozzle and nozzle holder as they are attached to one end of the head section, the head section being only partially shown, FIG. 11 is a side view, partially in section, of the improved proportioner and powder container, FIG. 14 is a side view of a second embodiment of the torch having attached thereto apparatus for the external feeding of the powdered material, and a windshield, FIG. 15 is an end-section view taken along section lines 15—15 of FIG. 14, FIG. 16 is a partial perspective view of a second embodiment of the windshield and showing the means for the attachment and the adjustment of both types of shields, FIG. 17 is a side view, partially in section, of still another embodiment of the torch, FIG. 18 is a perspective view of the torch handle used in the present invention, FIG. 19 is a top view, in section, of the torch handle shown in FIG. 18, FIG. 20 is a partial side view, in section, taken along section lines 20—20 of FIG. 19, FIG. 21 is a side view, in section, of an alternative embodiment of the apparatus used to adjust the powder feed control in the proportioner, FIG. 22 is a partial side view of the torch with an attached air ring for providing a shield against the wind, the ring being shown in section, FIG. 23 is a plan view of the passageways used to introduce the carrier gas into the proportioner and showing the restricted jets in these passageways, the opening from the powder container and the feed control plate being shown in broken lines, FIG. 24 is a top view of the torch of the present invention showing still a fourth embodiment of means for feeding the powder to the flame, FIG. 25 is an end view of the apparatus shown in FIG. 24 as seen from lines 25—25, FIG. 26 is a second view of the apparatus shown in FIG. 25, the powder feeding apparatus being off-center of the torch tip, FIG. 27 is a view of a torch shown in FIG. 24 but showing yet another embodiment of outside channel feeding means, FIG. 28 is an end view of the apparatus shown in FIG. 27 and taken along lines 28—28, FIG. 31 is a partial schematic view of remote control apparatus for regulation of the flow of powder into the proportioner, FIG. 32 is a schematic view of an arrangement of a torch and proportioner to provide a quick release of the pressure in the powder container, and FIG. 33 is a section view of the valve shown in FIG. 31, but showing the spool in its second position.

DESCRIPTION OF THE PREFERRED EMBODIMENTS

Figure 12:
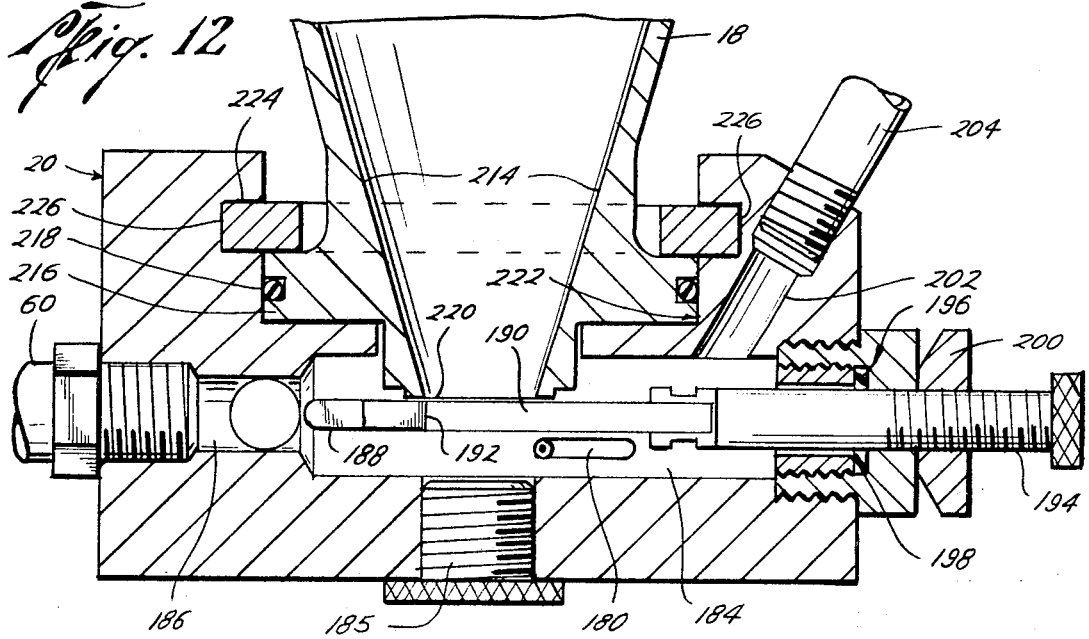
FIG. 12 is a side-section view of the proportioner, the powder container being partially shown.
Figure 13:
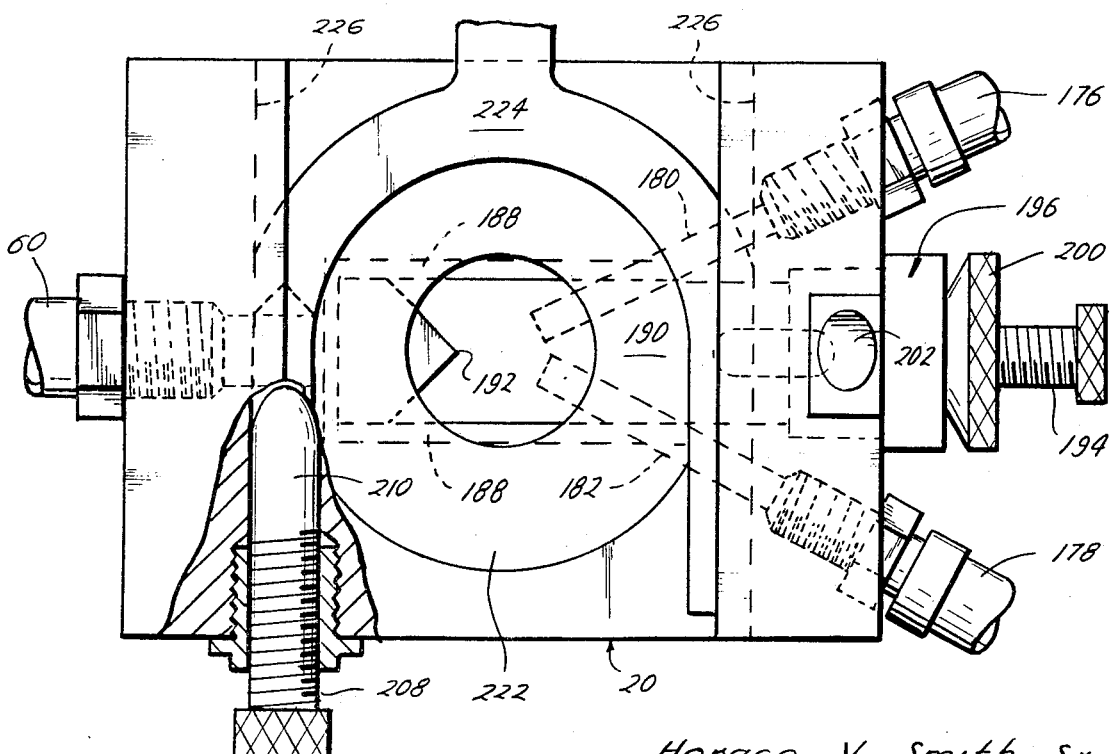
FIG. 13 is a top view, partially in section, of the apparatus shown in FIG. 12, the powder container being removed.

Turning now to FIG. 1, the present invention is comprised generally of a fuel gas source 10, a combustion sustaining gas source 12 (hereinafter called "oxygen") and a carrier and shroud gas source 14, all of which are connected by appropriate lines to the flame spraying torch generally indicated by numeral 16. The torch itself is comprised primarily of three sections, the handle portion 29, the head portion 30, and the nozzle portion 31. The invention is further comprised of a powdered material (hereinafter called "powder") source 18 mounted on top of a proportioner 20. The container 18 and proportioner 20 comprise the powder supply source and are connected by appropriate hoses to the torch 16.

More particularly, the fuel gas source 10 is connected by means of the pressure reducing regulator and valve 22, line 24 and valve 26 to a passageway 28 within the handle portion 29 of the torch. The oxygen source is likewise connected by the pressure reducing regulator and valve 32, line 34 and valve 36 to its passageway 38 in the handle assembly 29. The passageways 28 and 38 converge at the point 40 where intermixing of these gases begins.

The carrier and shroud gas source 14 is connected in a similar manner through pressure reducing regulator and valve 42 and line 44 to passageway 48 which leads to a chamber 50.

A passageway 76 leads from the chamber 50 to the head and nozzle portions and is controlled by valve 46. A carrier gas control valve 52 controls the amount of gas flowing from the chamber 50 through a passageway 54 to a line 56. The line 56 terminates at the pressure reducing regulator with pressure gauge 58 which controls the amount of carrier gas that is allowed to flow through the proportioner 20. On the exit side of the proportioner 20 a line 60 returns to the torch and connects with the passageway 62 which extends through the center of the entire torch.

Turning now to FIGS. 18-20, the construction of the handle assembly 29 will be discussed. The handle assembly 29 is comprised generally of a cylindrical gripping portion 64 which may be knurled or roughened in some manner to provide ease of holding. An enlarged section 66 provides for installation of valves 46 and 52 referred to later. The forwardmost portion 68 is reduced in diameter and is externally threaded for attachment to the head portion 30 as will be explained. The portion 68 terminates in the face or surface 69. This torch handle assembly is made from a single piece of material, the various portions being machined down and drilled to form the disclosed embodiment.

Turning now to FIG. 19, the flow of the shroud and carrier gas will be discussed. It should be noted that only the passageways for the shroud and carrier gas are shown in FIGS. 19 and 20 for ease of understanding. The remaining passageways 28, 38, and 62 are bored essentially straight through the handle portion 29 from one end to the other.

Passageway 48 extends down the center of the gripping portion 64 and opens into the transversely extending chamber 50. Valve seating portions 70 and 72 are located on opposite ends of the chamber 50, and due to their larger diameter, form seats or shoulders 74 adjacent the ends of the chamber 50. The valves 46 and 52 threadingly engage the seating portions 70 and 72. Members 75 which are resilient gaskets are positioned between shoulders 74 and the valves 46 and 52 to insure a fluid-tight seal.

Extending rearwardly from the seating portion 70 is the passageway 54 for movement of the carrier gas to the proportioner assembly 20. As will be readily understood, rotating the valve 52 in and out controls the degree of communication between the passageway 54 and the chamber 50, and accordingly, controls the amount of carrier gas passing through passageway 54 to the proportioner.

Extending from the seating portion 72 is a passageway 76. This passageway slants downwardly and forwardly as can be seen by a comparison of FIGS. 19 and 20. It then extends generally parallel to the longitudinal axis of the handle assembly and terminates in a groove 78 located in the face 69 of the handle. This groove 78 allows flow of the shroud gas to both passageways 79 and 80 (see FIG. 4) of the head 30.

Turning now to FIGS. 2 through 9, the torch head portion 30 will be discussed. The powder passageway 62 has been omitted from FIGS. 2 and 3 for the sake of clarity, but it is understood that this passageway extends the length of the torch head and generally along its longitudinal axis. At the rear, or left-hand end as viewed in FIGS. 2 and 3, of the head portion 30, two dowel pins 82 extend outwardly from a shoulder 84. The dowel pins 82 are received in two passageways (not shown) on the face 69 of the handle portion 29 for proper alignment of the head and handle passageways. A nut 88 is located on the head portion for attachment of the head to the threaded end 68 of the torch handle 29. The shoulder 84 mates with an internal shoulder (not shown) on the nut 88 to force the face 81 of the head assembly securely into contact with the mating face 69 of the handle with the nut screwed onto the handle.

An enlarged portion 90 contains intermixing and heat exchange means as will be described, and is partially comprised of the sleeve 92 shown here in section. The head portion terminates in the section 94 which has at its outermost end threads for attachment of the nozzle 31.

Discussing the path of travel of the fuel gas and oxygen, the passageways 28 and 38 converge at the point 40 to form the passageway 96. At the opposite end of passageway 96 and extending generally perpendicular thereto is a passageway 98 which connects the passageway 96 with a first annular passageway 100. A groove 102 extends between the annular passageway 100 and a second annular passageway 104.

Extending inwardly toward the center of the head assembly from the annular passageway 104 are four equally spaced passageways 106 (see FIG. 6). An axially extending passageway 108 extends from each of the four passageways 106 generally perpendicular thereto to annular recess 112 (FIG 10) at the forward end of the head assembly 30 which end mates with nozzle 31. A circular groove 112 is located in the face 110 and the passageways 108 terminate in this groove as seen in FIG. 10. The passageways 108 are not shown in FIG. 3.

Turning now to the flow of the shroud gas, the passageways 79 and 80 angle upwardly from the rearmost face 81 of the head assembly as is shown by passageway 79 in FIG. 2. These passageways terminate in openings 114 at an annular passageway 116. Passageway 116 is connected to a second annular passageway 118 by means of the groove 120. As can be seen by comparing FIGS. 2, 3 and 7, the passageways 79 and 80 connect (by means of openings 114) with the annular passageway 116 by angling in from the bottom of the passageway 116. In a similar manner, passageways 122 exit from the second annular groove 118 (see FIG. 8). The passageways 122 extend to the front 110 of the head assembly for conveying the shroud gas to the nozzle (see FIG. 9). As with the passageways 108, the broken lines showing the passageways 122 leading from the annular opening 118 are not shown in FIG. 3 for purposes of simplicity.

O-rings 123 form seals as required to keep the fuel gas and oxygen separated from the shroud gas as is shown in FIGS. 2 and 3.

Turning now to FIG. 10, a nozzle used in the preferred embodiment will be discussed. FIG. 10 is a section view taken along lines 10—10 of FIG. 9, but including the nozzle, and showing one passageway 122 and one passageway 108. The remaining passageways 108 and 122 are not shown in dotted lines for simplicity of illustration.

The nozzle assembly 31 is comprised generally of four elements. These are a nozzle adapter bushing or nut 124, a nut 126, a shroud gas adjusting nut 128, and a torch tip 130. The adapter bushing 124 is threaded onto the forwardmost end of the head assembly 30. The tip 130 is then placed against the end 110 of the head assembly, and the nut 126 is screwed onto the adapter bushing 124. A shoulder 132 on the nut 126 acts against a flange 134 of the torch tip 130 to insure a tight engagement by the tip with the surface 110. The shroud gas adjusting nut 128 is then threadedly engaged with the nut 126.

As can be seen from an examination of FIG. 10, the powder carrying passageway 62 continues through the torch tip 130 and terminates in a flared portion 136. The fuel gas moves through passageways 108 and into the annular passageway 112. A plurality of passageways 137 extend from the rear of the tip 130 to an annular chamber 138. Passageways 139 lead from the chamber 138 and terminate in a ring concentrically disposed with the passageway 62. The chamber 138 is formed by machining a peripheral groove in the outer surface of the tip 130 and then welding the ring 141 over the groove. The passageways 137 communicate at the rear of the torch tip with the passageway 112, and thereby complete the means used to convey the fuel gas through the torch.

The shroud gas moves through passageways 122, only one being shown in FIG. 10. A sloped portion 142 at the rear of the tip 130 results in the forming of an annular passageway 140 between the sloped portion 142, the surface 110 of the head portion and the forwardmost end of the bushing 124. A second annular passageway 148 is formed between the shoulder 132 and the shroud adjusting nut 128. Shroud gas enters the annular passageway 140 and is distributed evenly throughout. A plurality of passageways 144 located in the peripheral flange 134 communicate, by means of an annular groove 131 in the tip flange, with a like number of passageways 146 in the shoulder 132. An annulus 150 is formed between the inner surface of the shroud adjusting nut 128 and the outer surface of the tip 130.

As will be readily understood by an examination of this figure, the shroud gas moves from the annular passageway 140 through passageways 144 and 146 into the second annular passageway 148. From here the shroud gas passes through the annulus 150 and is forced out around the tip 130, the flame and the powder being ejected from the flared portion 136. By screwing the shroud gas adjusting nut back and forth the amount of shroud gas exiting from the passageway 150 can be controlled.

Returning now to FIG. 1, the means used to carry the powder to the torch will be discussed. The gas used to entrain and carry the powder is supplied to the proportioner 20 from chamber 50 through passageway 54 and line 56. Control of this flow of gas is provided by the valves 52 and pressure reducing regulator 58. A tube 170 extends from the regulator 58 and has a first branch 172 which has an extension 174 with downwardly extending openings 175 inside the powder container 18, as is best seen in FIG. 11. The line 170 then branches into members 176 and 178. Referring also to FIGS. 11, 12, 13 and 23, the lines 176 and 178 are connected to passageways 180 and 182, respectively, in the proportioner 20. These passageways angle inwardly generally toward the center point of a discharge opening 220 of the container 18 from which the powder is fed into the proportioner as will be explained.

Both of the passageways 180 and 182 terminate in restricted orifices or jets 181 as shown in FIG. 23. The proper sizing and positioning of the jets 181 make it possible to pick up and carry the powder from the proportioner to the torch with a minimum amount of carrier gas. For example, for passageways 180 and 182 having an inside diameter of one-eighth inch, satisfactory results can be achieved with a jet 181 having a diameter of forty-two thousandths of an inch.

The proportioner 20 is comprised generally of a rectangular block having a cylindrically-shaped chamber 184 extending horizontally through the block. The chamber 184 tapers into a smaller passageway 186 which forms the outlet and connects to the powder hose 60. On opposite sides of the chamber 184 are slots 188 within which a plate 190 having, a V-shaped groove 192, is slidably mounted. A drain plug 185 is provided in the block for quick emptying of both the chamber 184 and powder container 18.

At the end of the plate 190 opposite the V-shaped groove, the plate is attached to the adjustable screw 194 in such a manner that the screw is rotatable relative to the plate 190. A packing gland, generally indicated at 196 is threadedly engaged at one end of the chamber 184 and provides an O-ring seal at 198 with the adjustable screw 194. A nut 200 is threadedly engaged with the screw 194. As will be understood by one skilled in the art, fine adjustment of the screw 194, and in turn the plate 190, is achieved by rotation of nut 200 relative to the screw 194. Due to the fact that the screw 194 is only slidably engaged with the packing gland 196, rough adjustment is achieved by merely sliding the screw, in and out, limited only by the position of the nut 200. Screw 194 can be spring loaded to prevent vibration from moving it.

An alternate type of apparatus which may be used to adjust the plate 190 is shown in FIG. 21. A generally cylindrically-shaped member 195 is threadedly attached to the end of chamber 184 with the screw 194 slidably mounted therein. A non-rotating bushing 197 is threadedly engaging the screw 194 and is also slidable relative to the member 195. A spring 199 is positioned between the bushing 197 and the outermost end of member 195.

The spring 199 urges the bushing 197 toward the proportioner with a constant amount of force, and accordingly, maintains the bushing 197 in a relatively fixed position. Rotation of the screw 194 will thus move the plate 190 in and out. Means must be utilized to prevent simultaneous rotation of the bushing with screw 194 such as a longitudinally extending slot and rib 201. Quick emptying of powder container 18 and proportioner 20 is achieved by simply pulling back on the screw 194 with sufficient force to overcome the resistence of the spring.

A passageway 202 extends upwardly from the chamber 184 and connects with the line 204. As seen in FIG. 11, the line 204 opens at 206 into the interior of the powder container 18 near its top above the maximum powder level in the container and serves as a pressure equalizing line.

A powder flow control screw 208 is located near the exit end of the chamber 184 and in the narrowed portion 186. This screw 208 is threadedly engaged to the proportioner assembly and has a rounded end 210 which may be moved into the passageway 186 as desired by rotating the screw.

Turning now to the powder container, it is comprised of a generally upright container 212 which is tapered as at 214 near its bottom portion. A peripheral flange 216 is located at the lower enr of the container and has an O-ring 218 in its outermost surface for sealing purposes. An opening 220 is located in the bottom of the container for the flow of powdered material into the carburetor chamber 184.

The peripheral flange 216 seats in a circular opening 222. A yoke 224 fits into two slots 226 to securely fasten the powder container 18 to the proportioner 20 and to obtain a tight seal with the mating surfaces on the container 18 and the proportioner 20.

An access opening 234 is located in the top of the powder container and has L-shaped slots 236 for the attachment of a lid 238. The lid has a handle 240 and an O-ring seal 242.

Turning now to the operation of this first-discussed embodiment, the amount of fuel gas and oxygen flowing to the torch is controlled by the regulators and valves located at their sources with the valves located at the rear of the torch assembly generally being fully opened. Intermixing of these two gases begins at the point 40 in the head 30 and continues as the gases move through the annular passageways 100 and 104. The intermixed gases are then forced into the radially extending passageways 106 to the passageways 108 and eventually into the annular groove 112. This groove 112 in the face 110 of the head provides for an even distribution of the intermixed fuel gas and oxygen to the passageways 137. Additional intermixing takes place in the annular passageway 138 before the gases are ejected through passageways 139, where they are consumed in a flame.

In a similar manner, the shroud and carrier gas flows from its source to the chamber 50. By manipulation of the valve 46 (FIG. 18), a controlled amount of this gas will pass through passageway 76 to the head and nozzle portions. The C-shaped groove 78 in the face 69 allows communication by the passageway 76 to the two shroud gas passageways 79 and 80 (see FIG. 4). The shroud gas then moves to the annular chambers 116 and 118. At that point it passes into the passageways 122 for conveyance to the nozzle, and finally, outwardly through the annulus 150 where its volume is controlled by rotation of nut 128.

The valve 52 controls the amount of carrier gas that flows from the chamber 50 to the proportioner 20. Additional regulation of the volume and pressure of this gas is provided by the regulator 58.

A portion of the carrier gas is diverted through the line 172 to line 174. The remainder of the carrier gas will flow through lines 176 and 178, passageways 180 and 182, jets 181 and into the chamber 184 at a point below the supply opening 220 of the powder container 18. Accordingly, powder falling from the container 18 and into the chamber 184 will be picked up by the carrier gas stream and carried out of the exit end 186.

The upper portion of the powder container is placed into communication with the chamber 184 by the line 204 to equalize the pressure between these two areas. This prevents the occurrence of a negative pressure, relative to that in the chamber 184, above the powder in the container which would hinder the free flow of powder from the container to the chamber 184. Carrier gas is forced out of the openings 175 in tube 174 to prevent the powder from clogging or sticking together at or near the outlet 220.

The actual amount of powder flowing into the proportioner is controlled by the plate 190 and its V-shaped groove. As was previously explained, fine and rough adjustment is provided for this control plate. The use of this V-shaped groove, in conjunction with the injection of the gas from the line 174, the equalization of the pressure at the top of the powder container, combined with the smooth even taper at the bottom of the container, give the result of an improved and more even powder flow into the proportioner. Additional control is provided over the amount of the powder carried to the torch by use of the screw 208.

The structure of the proportioner disclosed herein provides for a more even distribution and pick-up of the powder by the carrier gas stream. The controls provided in this embodiment result in an effective regulation of the amount of powder supplied to the torch.

As the carrier gas stream with its entrained powder exits from the proportioner, it travels through the line 60 to the passageway 62 in the torch. This passageway extends throughout the length of the torch and terminates in the flared opening 136 at the nozzle end. At this point, the powder is ejected into the shrouded flame, whereupon it is melted, impinged on and bonded to the surface being coated.

As a result of the simplicity of design of this disclosed embodiment and of its improved controls and arrangement of elements, the present invention is capable of conveying in its carrier gas stream at about approximately five p.s.i. pressure, an amount of powder that would require 30 to 40 p.s.i. pressure in many prior art devices. These figures refer to the conveyance of aluminum powder. Heavier powders require a higher pressure, for example, zinc would require approximately 10 p.s.i. Not only does this result in savings due to the decreased amount of carrier gas needed, but also due to the decreased amount of fuel gas and oxygen needed. Since the gas carrying the powder to the flame tends to cool the flame, a decrease in the amount of carrier gas results in a hotter flame. Accordingly, a smaller flame can be used for normal amount of powder sprayed. Additional savings result from the simplified design of the torch and the proportioner and powder container assembly.

Due to the annular passageways 100, 104, 116, 118, 144, 148, and 138, the fuel gas, oxygen and shroud gas are used as a heat exchange medium to absorb the heat carried back to the torch head and nozzle assemblies from the flame. This has two results. It slightly preheats the gases being conveyed to the nozzle tip, and also cools the torch so that the powder will not stick to the nozzle and also aids in holding the torch.

Additional heat exchange means is provided by the grooves located in the exterior surface of the nut 126 in the nozzle. These grooves result in the exposing of a larger amount of surface area to the atmosphere with the result of an increased dissipation of the heat that develops in the torch nozzle from the flame.

As a combined result of the improved apparatus disclosed herein, a larger flame or a flame having a higher temperature may also be achieved, if desired. Adding to this the improved ability to convey the powder, larger quantities of powder can be sprayed with this apparatus. When a larger flame is used, the heat exchange means in the head and nozzle portions are extremely beneficial to the operator, as well as aiding in preventing the fusing of the powder to the torch nozzle.

A modification of the powder feeding means is shown in FIG. 14. In this embodiment, apparatus has been utilized which provides for the external feeding of the powder to the flame issuing from the nozzle end. The line 60 extending from the proportioner 20 connects with a line 152 which is attached to the torch by the plate 154 which slips over the nozzle end. The tube 152 branches into four equally spaced tubular members or branches 156, only two of which are shown in FIG. 14, the remaining two branches being hidden by the two branches shown. These branches 156 terminate in nozzles 158 which are directed inwardly toward the center point of the nozzle. This external feeding of the powder may be used alone or in conjunction with the internal feeding through passageway 62 discussed previously.

The external feeding of the powder brought about by the apparatus disclosed in FIG. 14 gives even further versatility to the improved powder spraying apparatus. Some materials form a better bond with the surface being sprayed when introduced into the flame in this manner. With other materials, a combination of the outside and inside feed can best be used. The type of feed to be used also depends, of course, on the quantity of powder being sprayed, the temperature at which it is being sprayed, the carrier gas used, the surrounding environment, size and shape of object being sprayed, etc.

As the powdered material is fed through the passageway 62 into the nozzle, heat generated by the flame will be carried back into the nozzle, which may tend to make the powdered material fuse to the powder passageway near the flared section 136 through which it is being conveyed. In addition to the heat exchange means discussed previously, this problem may also be overcome by use of the embodiment disclosed in FIG. 17, especially if inside feed of the powder is desired and the embodiment shown in FIGS. 14 and 27 cannot be used.

The torch shown in FIG. 17 is a modification of the first embodiment but the passageways are essentially the same as those in the first embodiment. One variation is that this embodiment has a 45 degree bend in the head. Connected shroud gas passageways 76 and 122 are shown in broken lines, the connection with valve 46 being only schematically shown. As with the nozzle of FIG. 10, the shroud gas in the nozzle of FIG. 17 normally passes through the annulus 150.

A concentric tube 162 is disposed within the powder passageway 62. The powder supply line 60 is connected to an external tubular member 164 which communicates with the tube 162. Accordingly, the powder supplied through the line 60 is fed through the concentric tube 162 rather than through passageway 62. Passageways 166 extend from the passageway 62 to the annulus 150 in nozzle 31.

As the powder is conveyed through the tube 162, a portion of the shroud gas passes through the passageways 166 from the annulus 150. This diverted shroud gas flows into the passageway 62 and around the tube 162, thereby providing a cooling medium for the tube 162. In this manner, the temperature of the powder within the tube 162 is kept at a minimum, and the fusing of powder to the nozzle is eliminated.

An alternate method of operating this embodiment is to connect another shroud gas hose to the passageway 62 and supply the cooling gas directly through this passageway. Sufficient gas may be supplied in this manner to also supply through passageways 166 the gas necessary to form the shroud, thus eliminating the need to supply shroud gas through the passageway 76. Alternatively, shroud gas may be supplied through both passageways 62 and 76.

The embodiment shown in FIG. 17 achieves not only the improved results of the first discussed structure, but also provides even greater protection against the fusing of the powder to the torch. By conveying the powder through the tube 162 which is surrounded by shroud gas, increased cooling of the powdered material is achieved.

Turning now to FIGS. 14, 15 and 16, a windshield generally indicated at 250 is shown for use in conjunction with the disclosed powder spraying apparatus. It is comprised of two generally C-shaped elements 252 and 254. The member 252 is slidably connected to the member 254 by the engagement of bolts and wing nuts 258 and slots 256. The edges of the members 252 and 254 are beaded as at 260 and 262, respectively, the bead 262 being sufficiently large so as to receive the bead 260 as is shown in FIG. 15. This construction insures proper alignment of the member 252 with respect to the member 254.

The windshield is attached to the torch by means of a bracket generally indicated at 264. The bracket includes a clamping collar 266 which clamps about the neck portion of the head of the torch 30 by means of the bolt and wing nut 268. An upstanding flange 270 is connected to the collar and has a C-shaped slot 272. An upstanding bracket 274 is slidably attached in the slot 272 by the bolt and wing nut 276. Radiating outwardly from the uppermost end of the bracket 274 are three equally spaced support members 278, the outer ends of which are fixedly attached to the members 254 for support of the windshield.

A second embodiment of the windshield is shown in FIG. 16 and is comprised of two cylindrically shaped shields 280 and 282, as compared to the two semicylindrically shaped elements 252 and 254 of the embodiment of FIG. 14. The shield 282 telescopes into the shield 280 and is attached thereto by the slots 256 and bolt and nuts 258. The means of attachment to the torch are, of course, the same for both shields.

The use of the windshields shown in FIGS. 14–16 allows flame spraying in windy conditions which, prior to this time, has not been satisfactory. For most uses, the shield shown in FIG. 14 is satisfactory but the embodiment of FIG. 16 provides more complete protection due to the fact that it completely encompasses the flame. It is, therefore, used in conditions of sudden and unexpected shifts of the wind. It is to be understood that the windshields may be adapted for use on any torch, as is also true of the outside and concentric tube feed arrangements.

Other apparatus used to shield the flame from the effect of wind is shown in FIG. 22. It is comprised generally of a hollow ring 286, shown here in section, which is concentrically disposed about, but slightly in front of, the nozzle 31. An air or gas hose 288 is connected to the ring by attaching means 290. An inert gas can be used here if desired in place of air. Approximately thirty openings or jets 292 are spaced about the outermost face of the ring of this preferred embodiment. These jets are angled outwardly as is shown by an extension of their center lines indicated by the letters A. The lines B are generally parallel to the path of the flame and powder issuing from the nozzle, and the slope of lines A relative to lines B is approximately two inches to ten inches.

The outward angle of the jets prevents the interference of the flame spraying process by the air or gas ejected under pressure even though this air or gas will tend to expand as it is forced from the jets. The result is a cylinder of air surrounding the flame which is sufficient to prevent disruption of the spraying process by wind. This air shield also has the effect of knocking loose powder from the surface being sprayed, thus providing a more complete bond.

Turning now to FIGS. 24–26, still another type of apparatus will be discussed which may be used to feed the powder to the flame issuing from the torch. It should be noted that in this embodiment as seen in FIG. 24 the connections at the rear of the torch for the various hoses are not shown for purposes of simplicity.

This embodiment is generally comprised of a Y-shaped feeding tube indicated at 300. The Y-shaped tube has two branches or channels 302 and 304 each of which terminates with an inwardly curved portion 306 and nozzle opening 308. An appropriate connecting nut is located at the rear of the Y-shaped element 300 for attachment to the powder supply hose 60. The Y-feed tube 300 is placed about the torch 16 as shown in FIG. 24 with its branches on opposite sides of the torch. It is held onto the torch by the combined action of two members. The first of these is a yoke 310 which is located about the handle portion 29 of the torch. A set screw 312 is located in the yoke 310 for adjustment relative to the torch.

The second element used to mount this feeding apparatus onto the torch is a clamping member, generally indicated at 314, which is comprised generally of a U-shaped member 316 which has two sets of ears or dogs 318 mounted in opposed relation. A latching bar 320 is pivotally mounted at 322 and carries a locking screw 324. This bar is latched by means of a pin 326 across the open end of the member 316. The screw 324 may then be adjusted to securely lock the member 314 in place.

When the member 314 is in the position shown in FIG. 25, the nozzle portions 308 of the branches 302 and 304 lie along a common centerline 330 with the torch tip nozzle. By loosening the screw 324, however, the member 314 may be rotated in either direction to assume a tilted position as, for example, in FIG. 26. The yoke 310 prevents the Y-shaped feed member 300 from turning with the member 314. Accordingly, the nozzles 308 will no longer point toward the center of the flame as in FIG. 25. Instead, one nozzle will point at the portion of the flame above the centerline 330 and the other below the centerline. This is illustrated in FIG. 26 by comparison of the centerline 330 with the centerlines 332 and 334 of the branches 302 and 304, respectively. The distances between the centers 332 and 334 and the centerline 330 may be varied by further rotation of member 314.

The result of rotating the member 314 to move the members 302 and 304 into the position shown in FIG. 26 is to introduce the powder into the flame from a more tangential approach, as compared to the directly opposed and centered approach which would result with the branches positioned as in FIG. 25. It has been found that with certain heavy powders being fed from an outside feeding arrangement, the cross-sectional area of the flame is changed or narrowed due to the force exerted on the flame by the powder. With very light powders, the force of the flame itself resists the introduction of the powder, sometimes resulting in an inconsistent distribution of the powder throughout the flame. The apparatus disclosed in FIGS. 24–26 provides structure to overcome this disadvantage by the somewhat tangential feeding of the powder to the flame. When powder is introduced from the positions shown in FIG. 26, the powdered material moves into and with the flame along a spiraled path, resulting in a more even intermixing of the powder with the flame, and thereby providing a better pattern of spray. Furthermore, this intermixing takes place without distorting the flame itself.

A further adjustment may be made with this embodiment by simply pushing forward or pulling back the Y-shaped element 300 to vary the angle of entry of the powder into the flame. This is demonstrated by the dotted outline of the Y-shaped element shown in FIG. 24. The nozzle portions 308 not only move forwardly or rearwardly, but also toward or away from the longitudinal axis of the torch and flame due to the curved portion 306 on each of the branches 302 and 304. In the position shown in dotted lines in FIG. 24, the feeding element 300 has been moved rearwardly. The optimum position and orientation of this powder feeding arrangement can best be determined by trial and error for each powder used.

Turning now to FIGS. 27 and 28, yet another embodiment of powder feeding apparatus will be discussed. Once again the hose connections at the rear of the torch 16 have been omitted for purposes of simplicity.

This embodiment also consists of an outside feed arrangement which has a first Y-shaped portion 340. This portion of the feeding apparatus is attached to the torch by a yoke 310 and screw 312 identical to that discussed in the last embodiment. Each of the channels in the Y-shaped portion 340 diverge at 341 into three separate feeding channels indicated at 342. A bar 344 is welded to each of the three channels in each set to maintain them in properly spaced position. A plate 346 is placed about the front of the nozzle and contains six notches 348. A separate feeding channel 342 is placed in each of the notches 348 as can best be seen in FIG. 28. A strap 350 is tightened about the feeding channels 342 to the rear of the plate 346 for securing the feed channels in their respective notches 348.

As is best seen in FIG. 28, each of the individual feeding channels 342 terminate in openings 352 which are directed toward the center of the nozzle 31. Accordingly, the flow of powder and carrier gas issuing from each of the nozzle openings 352 will theoretically meet in front of the nozzle 31 and on the longitudinal axis of the torch 16. In actual practice, however, the force of the flame usually prevents the powder streams from making contact and causes the powder to move forward with the flame whereupon the powder is melted.

In using this embodiment of the present invention, suitable coupling means are provided at the rear of the Y-shaped portion 340 for connection of the feed channel arrangement with the hose 60 leading from the proportioner. As the powder and carrier gas enters the Y-shaped portion 340, its flow is split or divided along the two channels of this portion 340. Upon reaching the points of divergence 341, the flow of material in each respective channel is divided into three equal portions, each of the portions moving along one of the three channels 342. Accordingly, six evenly divided streams of carrier gas and powder issue from the openings 352 and into the flame at the nozzle.

It has been found that the use of six channels to feed the powder into the flame results in less distortion of the flame and a more intimate contact by the individual powder particles with the flame. This is especially true with the heavier powders such as zinc. With these heavier powders, the flame pattern is distorted and the powder is not evenly distributed throughout the flame, resulting in incomplete melting of the powder and an uneven coating. These undesirable results are more pronounced when the powder is sprayed in large quantities. By dividing the powder into six streams, however, the greater weight and mass of such powders and/or quantities is effectively reduced at the point of contact with the flame. The effect on the flame is lessened and better distribution of the powder in the flame is achieved.

Figure 29:
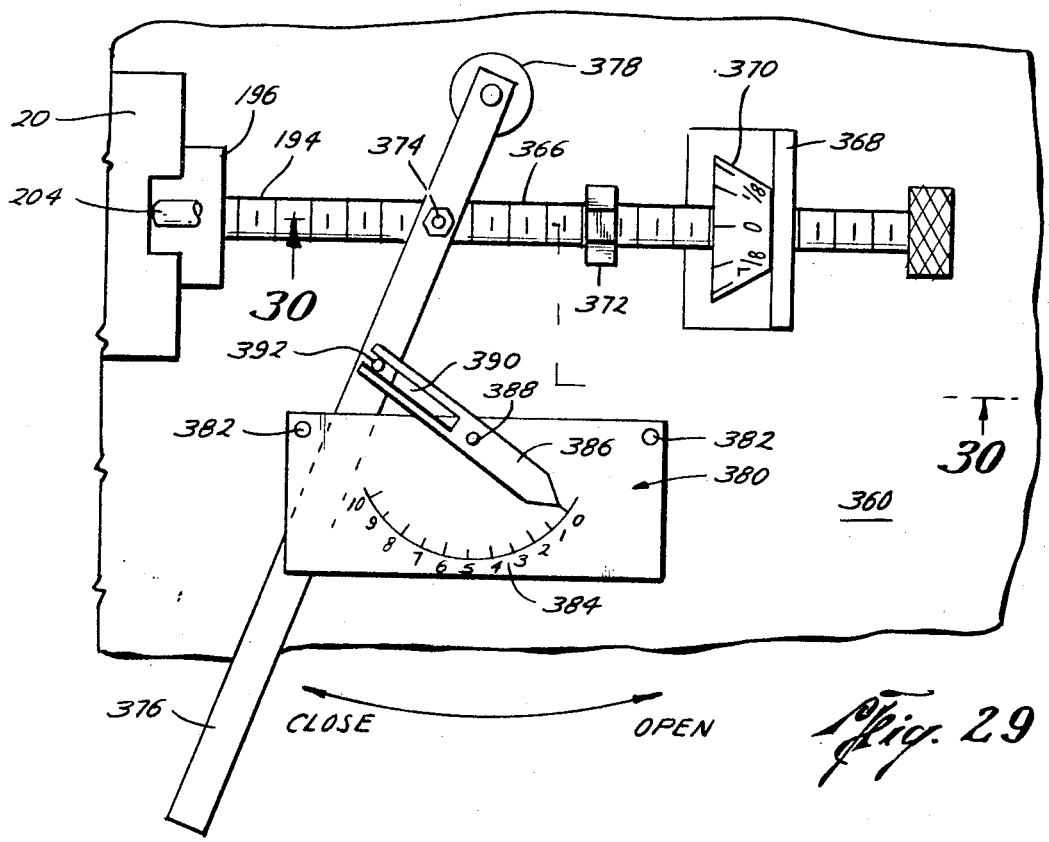
FIG. 29 is a plan view of a lever actuated feed control for the proportioner.
Figure 30:
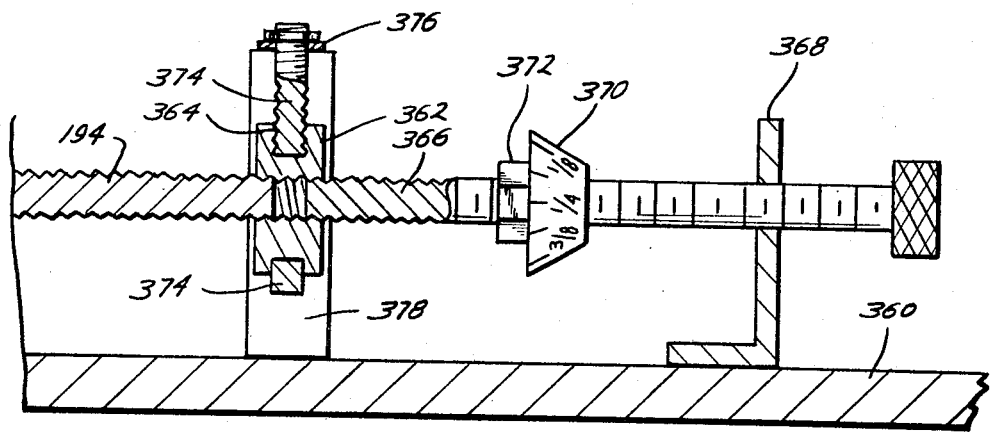
FIG. 30 is an elevation view, partially in section, of the apparatus shown in FIG. 29 and taken along section lines 30—30, the nuts 370 and 372 being changed from their position in FIG. 29.

Turning to FIGS. 29 and 30, apparatus is shown for manually controlling the plate 190 which controls the amount of powder fed into the proportioner 20. The proportioner 20 is only partially shown in this figure and is attached to a plate 360, as are the other pieces of apparatus to be described below.

The threaded rod 194 extends from the proportioner as in the embodiment of FIG. 12, the arrangement within the proportioner being the same as that shown in FIGS. 12 and/or 21. The rod 194, however, instead of having a gripping knob, is attached to the cylindrical collar 362 which has a groove 364 about its outer surface. Also attached to the collar 362 is a second threaded rod 366 which extends from the side of the collar opposite the rod 194. The rod 366 is supported above the plate 360 by means of the L-shaped bracket and stop 368. Mounted on the threaded rod 366 is a nut 370 having thereon markings to indicate its rotation about the rod down to one-eighth of a revolution. These markings may, of course, vary as desired. Also mounted on rod 366 is a nut 372.

A yoke 374 is mounted about the collar 362 and received within the groove 364. This yoke extends upwardly and is connected to a handle 376 which is pivotally mounted on the upright support 378.

A plate 380 is positioned above but attached to the plate 360 by support members 382. This plate 380 is located above the handle 376 as seen in FIG. 29. Located on the plate is a scale 384 for indicating the distance moved by the rod, collar and lever arrangement, as will be explained. Mounted on the plate 380 is a pointer 386 which is rotatable about the point 388. An elongate groove 390 is located in the rear of the pointer 386. This groove slidably receives an upstanding lug 392 which is carried by the handle 376.

In operation, the invention functions by movement of the handle 376 about its axis at 378, causing the rod 194 to slide in and out of the proportioner 20, opening and closing the gate 190 (see FIG. 12). In the position shown in FIG. 29, the plate 190 is completely closed, and accordingly, the pointer 386 is pointed toward the zero numeral on the scale 384. To allow powder to flow into the proportioner, the handle is moved to the right as viewed in FIG. 29, or in the direction of the arrow in FIG. 29, to slide the plate 190 to an open position. In the position shown in FIG. 29, however, the nut 370 will prevent movement of the lever 376 to the right due to its contact with the L-shaped bracket 368. Rotation of the nut 370 away from the bracket, however, will allow such movement. It is in this manner that the amount of powder allowed into the proportioner is controlled, and it is this apparatus that enables the operator to shut off the powder and later return to the same rate of feed.

By way of example, the operator can rotate the nut 270 one complete revolution away from the L-shaped bracket 368. By then pulling the lever 376 to the right or in a counterclockwise direction, the rod will also move to the right until the nut 370 again contacts the L-shaped bracket 368. This movement of the lever 376 will cause the pointer 386 to rotate in a clockwise direction. By proper proportioning of the scale 384, the movement of the lever in our example will direct the pointer to the numeral 1. To shut off the powder feed, the operator merely has to move the lever in a clockwise direction and the rod 194 is moved inwardly, thus moving the plate 190 across the opening from the powder container.

Should the operator wish to repeat the rate of feed employed in our last example, he merely has to move the lever in its counterclockwise direction once again. If the nut 370 is still properly positioned, the rate of feed will be duplicated. Should the nut 370 be moved, however, this will be indicated on the scale 384. Accordingly, adjustments can be made by rotation of the nut and further movement of the lever 376. The nut 372 can be rotated to a position adjacent the nut 370, as shown in FIG. 30, to prevent accidental movement of the nut 370.

In this manner, the operator may find the optimum rate of feed and set the nut 370 accordingly. He may then open and close the powder feed any number of times, always returning to approximately the same rate of feed, so long as the nut 370 remains properly positioned. Proper use of the lock nut 372 will insure against movement of the nut 370 due to vibration or accident.

Another use for this embodiment is for the determination of the optimum rate of feed for powders to be sprayed or for spraying under conditions with which the operator is unfamiliar. Tests may be conducted varying the amount of powder feed by rotation of the nut 370. The results obtained with each revolution or partial revolution can then be charted. From this chart and by use of the control nut 370, the operator can select the proper rate of feed for any given set of conditions. This assists in instructing others in the use of this apparatus.

As can be seen, therefore, use of this lever arrangement provides a reliable control for the rate of feed of powder into the proportioner, as well as a means whereby the operator can leave and return to a predetermined rate of feed as desired. This apparatus also provides a means whereby controlled tests may be run at various rates of feed, under varying conditions, and provide the operator a reliable guide for determining the optimum rate of feed for similar conditions. At the same time, this arrangement provides for quick opening and closing of the powder feed control.

FIGS. 31 and 33 disclose apparatus with which the operator of a flame spraying torch can remotely control the amount of powder fed from the powder container 18 into the proportioner 20. The arrangement of the parts in FIG. 31 is the same as with the principal embodiment discussed previously and disclosed, for example, in FIGS. 1, 12 and 13. The few modifications necessary to incorporate this remote control apparatus will now be discussed.

The line 56 leading from the torch 16 (not shown in FIG. 31) connects with the pressure reducing regulator 58. A vent 390 extends off of the line 56 and is open to the atmosphere. This vent 390 has a restricted orifice 392, whereby a limited amount of gas passing through line 56 is released. A second line 394 connects with the diaphragm chamber 396 of a four-way valve 400. This valve 400 is also comprised of an elongate chamber 398 which contains a spool 399 and spring 401, the valve 400 being a device well known in the art.

Two lines 402 and 404 connect with the spool chamber 398 as do vents 406 and 408. Also connecting with this chamber 398 is a line 410 which leads from a source of pressurized gas, which source is not shown in FIG. 31, but may consist of a tank such as 10, 12 or 14 of FIG. 1, having the appropriate gas control valve.

The lines 402 and 404 are connected to an actuator diaphragm valve housing 412, the housing 412 containing a diaphragm which is connected to the rod 194 extending from the proportioner. The rod is connected to the plate 190 for control of the powder fed from the container into the proportioner. The lines 402 and 404 are connected to opposite sides of the diaphragm contained within the housing 412. Pressure exerted through line 404 will result in movement of the diaphragm within the housing 412 and connected rod 194 to the right as viewed in FIG. 31, which, in turn, moves the plate 190 from across the opening 220 of of the powder container, allowing powder to flow into the proportioner. Pressure exerted on the diaphragm through line 402 will reverse the movement of the plate 190, thus closing opening 220 and stopping the flow of powder. The arrangement of the rod 194 and the plate 190 is as disclosed in FIGS. 12 and 13. The size of opening 220 can be controlled by the position of adjustment nut 200.

Discussing now the operation of the remote control apparatus, when no carrier gas is flowing through the line 56, the spool 399 is spring biased into a first position, which is shown in FIG. 31. In this position, the line 402 is placed into communication with the line 410, whereby the pressurized gas flows into the diaphragm housing 412 through line 402. In addition, the line 404 communicates with its vent 408, thus venting the left side of the diaphragm located in housing 412. The result of this is that the diaphragm within housing 412, the rod 194 and plate 190 are moved to the left as viewed in FIG. 31, whereby the opening 220 is closed and remains closed due to the spring bias in valve 400.

To allow powder to flow into the proportioner 20, the operator opens valve 52 (see FIG. 18) which allows carrier gas to flow through line 56. Essentially all of the carrier gas will flow through the pressure reducing regulator 58 and into the proportioner as in the principal embodiment disclosed herein. A portion of the carrier gas, however, will be diverted through the line 394 and into the diaphragm housing portion 396 of valve 400. This pressure is sufficient to overcome the spring bias exerted on the spool 399, and in turn, the diaphragm in housing 396, and move the spool into its second position, which is shown in FIG. 33. In this position, the line 404 is placed into communication with the line 410 and line 402 with its vent 406. Accordingly, the pressurized gas flows to the left side of the diaphragm in the housing 412, while the portion of this housing on the right side of the diaphragm is exhausted. The result is movement of the diaphragm to the right as viewed in FIG. 31, which results in movement of rod 194 and plate 190 to the right also. This opens the opening 220 allowing powder into the proportioner 20.

Should the valve 52 on the torch be shut off, to prevent powder from continuing to flow into the proportioner due to the fact that the pressure in lines 56 and 394 would prevent the spool from returning to its first position, it is necessary to exhaust the line 56. For this reason, the vent 390 has been included. This vent has a restricted orifice 392, whereby only a small amount of carrier gas is allowed to vent to the atmosphere. The loss of this small quantity does not materially affect the operation of the powder spraying apparatus.

As can be seen, therefore, by use of the apparatus disclosed in FIG. 31, the operator can effectively control the powder fed into the proportioner by controlling the carrier gas which flows to the proportioner. By proper proportioning of the parts on the spool 399, particularly the sealing members 403 on the spool, one can control the degree or amount of communication between the various lines and vents and the inlet for the line 410. In this manner, the pressures on either side of the diaphragm in housing 412 may be varied. This would allow the operator to open or close the opening 220 by a varying amount, depending upon the amount of carrier gas that he allows to flow through line 56. The amount of carrier gas would affect the pressure exerted on the diaphragm and valve 400, thus changing the position of the spool relative to the inlets and outlets in the housing 398.

Precise control of the size of the opening 220 may be obtained by the use of a prior art valve positioner on rod 194. The use of this device, which is well known in the art, will vary the size of the opening 220 in proportion to the pressure in line 402. The amount of powder introduced into the proportioner 20 can further be controlled by the nut 200.

The last discussed apparatus is very handy where the operator is working with the torch at a place remote from the powder source, for example on a scaffold. By use of this apparatus, he need not return to the powder source in order to control the amount of powder fed into the proportioner but can do this at his remote position. Another advantage is realized when used on such as a scaffold due to the fact that should the operator in one of the other embodiments discussed herein shut off the carrier gas without closing the gate 190, powder will continue to flow into the carburetor and be carried into line 60 until the pressure is reduced to a point that the powder will be deposited in the line 60. This will result in a backup of powder which will be difficult to overcome when restarting the spraying operation. Even should the carrier gas be capable of moving through the powder accumulated in the line 60 and proportioner when restarting the operation, uneven distribution will obviously result. With the invention disclosed in FIG. 31, however, the gate is closed as the carrier gas is shut off thus preventing the problem just discussed.

Turning now to FIG. 32, a modification of the remote control device is disclosed. Although this arrangement does not open and close the powder feed, it does prevent the clogging of the line as will be described. As with the embodiment of FIG. 31, the torch, proportioner 20 and powder container 18 are the same as discussed with the first embodiment disclosed herein. Unlike the embodiment disclosed in FIG. 31, however, the operation of the powder gate 190 is manual as disclosed in FIG. 12.

A two-way valve 420 is connected in the line 56 upstream of the pressure reducing regulator 58. A vent 422 having a restricted orifice 423 is located in line 56 on the torch side of the valve 420. The spool chamber 424 has connected thereto a line 426 leading from an external source of pressurized gas and a line 428 connected to the pressure reducing regulator 58 for conveying the pressurized gas from the chamber 424 to the pressure reducing regulator 58. Also contained in this chamber is a vent 432, and a line 430 extending from the line 204. By means of the line 430, the interior of the chamber 424 is placed into communication with the interior of the upper portion of the powder container 18. As will be remembered, the line 204 connects the upper portion of the container 18 with the chamber 184 of the proportioner 20. It is this line 204 that results in the equalization of the pressure above the powder in the container 18 with the pressure in the chamber of the proportioner. This equalization of pressure prevents the creation of a vacuum above the powder in the container 18 which would hinder the feeding of the powder into the proportioner.

The spool within valve 420 has first and second positions. In the first position, the inlet 426 for the pressurized gas is blocked out of communication with any other valve connection, as is line 428. Line 430, however, is connected with vent 432. This first position is the normal or spring-biased position for the spool of valve 420. In its second position, vent 432 and line 430 are blocked off, while line 426 communicates with line 428 to allow the flow of pressurized gas to the pressure reducing regulator 58. In this embodiment, the gas from line 426 functions as the carrier gas, rather than gas from the line 56.

In the normal operation of the embodiment disclosed in FIG. 1 of the torch arrangement, when the operator is finished spraying, the valve 52 is closed, thus shutting off the flow of carrier gas to the proportioner. If the plate 190 is not closed prior to the shutting of valve 52, the pressure that has built up in the upper portion of the powder container 18 will be vented through the line 204 and into the chamber within the proportioner. This pressure will move the powder out of the chamber and into the line until the pressure decreases. As will be understood, this could result in a clogging of the line with undesirable results such as slugs of powder moving through the line 60 upon restart of the operation.

In the operation of the embodiment of FIG. 32, however, the valve 52 is opened to allow the gas to flow to the diaphragm of the valve 420. This pressure is sufficient to overcome the spring force biasing the spool into its first position, and accordingly, to move the spool into its second position in which the line 426 is placed in communication with line 428. The line 430 is sealed from vent 432, thus preventing any undesirable affect on the closed pressure system of the powder source. The gas from line 426 then flows through the pressure reducing regulator and on to the powder container 18 and proportioner 20 to pick up the powder as with the embodiment of FIG. 1.

When the operator desires to cease operation, the valve 52 is closed and the vent 422 allows the escape of gas in line 56, whereby the spring force against the spool will return it to its first position. This opens vent 432 to line 430. The gas in the top of the container 18, rather than moving through line 204, will now move through line 430, due to the fact that the pressure here will be less than the pressure in the proportioner chamber. Since the line 430 is now in communication with the vent 432, this gas pressure will be vented to the atmosphere. Thus, the problem of the pressure that is built up in the powder container carrying the powder into the hose 60 is overcome.

As can be seen, therefore, the present invention achieves the objectives set forth at the outset. A simplified design has been disclosed which provides for ease of manufacturing and assembly and assures the proper obtaining and maintaining of the various seals and joints. This results, to a great extent, from the utilization of a single piece of metal to form elements where possible. Increased control over the amount of powder sprayed is effectively achieved as is also true with the feeding of the powder to the carrier gas stream. A decreased amount of carrier gas is needed with the present invention to carry a proportionate amount of powder, resulting in a decrease in the temperature of the flame necessary to properly melt and spray the powder. Furthermore, the present invention results in the ability to spray larger quantities at increased temperatures where desired. This gives a broader range of use for the powder spraying apparatus.

Provision has also been made to counteract the heat which is carried back into the torch by use of the gases conveyed to the nozzle tip by the proper use of heat exchange as disclosed. This overcomes the increased tendency of the powder to fuse to the torch and results in some preheating of the gases used in the torch. This heat exchange means is also utilized to more completely intermix the fuel producing gases which also reults in increased quality of the flame produced. Other advantages which flow from the apparatus are set forth throughout the specification, while still others will be apparent from an examination of the disclosure. The present invention is, therefore, well adapted to carry out the objects and to attain the ends and advantages mentioned, as well as others inherent therein.

What is claimed is:
1. A torch for flame spraying powdered material comprising,
   a handle portion,
   a head,
   a nozzle attached to said head,
   first passageway means extending through said torch for conveying under pressure fuel and combustion sustaining gases to the nozzle for creation of a flame,
   first heat exchange means in said head in communication with said first passageway means for the absorption by said fuel and combustion sustaining gases of heat created by the flame,
   second passageway means in said torch for conveying under pressure a shroud gas to said nozzle,
   second heat exchange means in said head in communication with said second passageway means for absorbing heat created from the flame by the shroud gas passing through the second heat exchange means,
   a third passageway for conveying under pressure the powdered material suspended in a carrier gas to said nozzle, each of said heat exchange means including,
   at least one chamber extending generally transverse to its respective passageway means, through which the gases must pass that are being conveyed through the passageway means, whereby these gases are delayed in their movement to the nozzle.
2. The invention of claim 1 and further including,
   third heat exchange means located in said nozzle in communication with said first passageway means, and being comprised of a chamber extending generally transverse to the first passageway means, through which chamber the fuel and combustion sustaining gases pass.
3. The invention of claim 2 wherein,
   said first passageway means is defined as including,
      (i) a fuel gas passageway for conveying the fuel gas to the first heat exchange means,
      (ii) a combustion sustaining gas passageway for conveying the combustion sustaining gas to the first heat exchange means,
      (iii) a first plurality of passageways extending from the first heat exchange means to the nozzle,
   said first heat exchange means being comprised of first and second generally annular chambers extending near the exterior surface of the head and in communication with each other,
   said second passageway means being defined as including,
      (i) a second plurality of passageways connected to the second heat exchange means, and
      (ii) a third plurality of passageways extending from the second heat exchange means to said nozzle,
   said second heat exchange means being defined as including third and fourth generally annular chambers extending near the exterior surfaces of the head and being in communication with each other, and
   said third heat exchange means is defined as including a chamber in said nozzle.
4. The invention of claim 3, and including
   a control chamber in said second passageway means,
   said second plurality of passageways extending from said control chamber,
   a carrier tube extending from said chamber for conveying a portion of said shroud gas to a powdered material source, and
   control means operatively connected to said control chamber for regulation of the shroud gas conveyed through said second plurality of passageways and through said carrier tube.
5. The invention of claim 1 wherein,
   each of said chambers being located in a separate cross-sectional area of the torch,
   each of said chambers extending throughout a substantial portion of its respective cross-sectional area.
6. The invention of claim 1 and including,
   a tube concentrically disposed about a portion of said third passageway at said nozzle, said tube being connected to said second passageway means, whereby at least a portion of said shroud gas flows through said tube and around said third passageway means.
7. The invention of claim 1 and including,
   a tube extending through at least a portion of said third passageway at said nozzle, said powdered material suspended in said carrier gas being conveyed through said tube rather than the third passageway, said third passageway being connected to a means for supplying gas through at least said portion of the third passageway whereby it flows around the tube.

8. The invention of claim 1 and including,
an outlet in said nozzle for said third passageway,
a first plurality of outlets in said nozzle for said first passageway means and being concentrically disposed about said outlet,
a second plurality of outlets in said nozzle for said second passageway means and being concentrically disposed about said first plurality of outlets, and
first conduit means having at least one outlet disposed outside of said second plurality, whereby said powder material suspended in the carrier gas may be fed from inside or outside of the flame.

9. The invention of claim 8 wherein said first conduit means has a third plurality of outlets concentrically disposed about said second plurality of outlets.

10. The invention of claim 9 wherein said first conduit means is further defined as including,
a generally Y-shaped portion having two channels of feed, wherein the carrier gas and suspended powder material are divided into two streams,
each of said channels being divided into three feed channels which terminate in said third plurality of outlets, said feed channels being directed toward a point lying in front of said third passageway outlet.

11. The invention of claim 1 and including,
windshield means connected to said torch for providing a shield for the flame and powder material being sprayed.

12. The invention of claim 11 wherein said windshield means includes,
a generally C-shaped shield extending outwardly from the nozzle around the flame and being rotatably connected to said torch.

13. The invention of claim 11 wherein said windshield means includes,
a cylindrical shield extending outwardly from the nozzle around the flame.

14. The invention of claim 11 wherein said windshield means includes,
gas jet means positioned around said nozzle for providing a cylinder of pressurized gas extending outwardly from the nozzle around the flame.

References Cited

UNITED STATES PATENTS

| | | | |
|---|---|---|---|
| 2,108,998 | 2/1938 | Schori | 239—85 |
| 2,549,736 | 4/1951 | Wiese | 239—85 |
| 2,813,750 | 11/1957 | Marantz | 239—85 |
| 3,438,579 | 4/1969 | Wiese | 239—85 |

EVERETT W. KIRBY, Primary Examiner